(12) United States Patent
Conrad

(10) Patent No.: US 8,669,499 B2
(45) Date of Patent: Mar. 11, 2014

(54) METHOD AND APPARATUS FOR COOKING USING A COMBUSTIBLE GAS PRODUCED WITH AN ELECTROLYZER

(75) Inventor: Wayne Ernest Conrad, Hampton (CA)

(73) Assignee: G.B.D. Corp., Nassau (BS)

( * ) Notice: Subject to any disclaimer, the term of this patent is extended or adjusted under 35 U.S.C. 154(b) by 0 days.

(21) Appl. No.: 13/610,366

(22) Filed: Sep. 11, 2012

(65) Prior Publication Data

US 2013/0008317 A1   Jan. 10, 2013

Related U.S. Application Data

(62) Division of application No. 11/577,887, filed as application No. PCT/CA2006/000673 on May 1, 2006, now abandoned.

(60) Provisional application No. 60/676,302, filed on May 2, 2005, provisional application No. 60/780,836, filed on Mar. 10, 2006.

(51) Int. Cl.
*H05B 3/68* (2006.01)
*A47J 37/07* (2006.01)

(52) U.S. Cl.
USPC .................. 219/449.1; 126/39 BA; 126/515; 126/39 R; 126/211; 426/523; 99/340; 99/339; 99/324; 204/256; 204/257; 204/258; 204/264

(58) Field of Classification Search
USPC ............. 126/39 BA, 512.39 R, 211; 426/523; 99/340, 339, 324; 204/256–8, 264, 204/275; 219/449.1
See application file for complete search history.

(56) References Cited

U.S. PATENT DOCUMENTS

| 2,304,302 A | 12/1942 | Crupi |
| 2,658,987 A | 11/1953 | Ogden |
| 3,273,489 A | 9/1966 | Wilson |
| 3,632,962 A | 1/1972 | Cherniak |
| 4,508,097 A | 4/1985 | Berg |
| 4,899,723 A | 2/1990 | Pajares |
| 4,926,837 A | 5/1990 | Parker et al. |
| 5,275,147 A | 1/1994 | Aktinson |
| 5,329,918 A | 7/1994 | Di Bari |
| 6,036,827 A | 3/2000 | Andrews et al. |

(Continued)

FOREIGN PATENT DOCUMENTS

| CN | 2138760 Y | 7/1993 |
| CN | 2177902 Y | 9/1994 |

(Continued)

OTHER PUBLICATIONS

International Preliminary Report on Patentability and Written Opinion in relation to PCT/CA2006/000673, issued Nov. 6, 2007.

(Continued)

*Primary Examiner* — Shawntina Fuqua
(74) *Attorney, Agent, or Firm* — Bereskin & Parr LLP/S.E.N.C.R.L., s.r.l.; Philip C. Mendes da Costa

(57) ABSTRACT

A domestic apparatus, such as a cooking appliance, uses hydrogen and, optionally electrical heating, to cook food. The cooking appliance may have a cooking surface (e.g. a grilling surface) so as to result in an indoor barbeque, which may be used with no venting or reduced venting requirements.

21 Claims, 19 Drawing Sheets

(56) References Cited

U.S. PATENT DOCUMENTS

| | | | |
|---|---|---|---|
| 6,073,542 | A | 6/2000 | Perez |
| 6,222,163 | B1 | 4/2001 | Arntz et al. |
| 6,474,330 | B1 * | 11/2002 | Fleming et al. ............... 126/512 |
| 6,877,503 | B1 | 4/2005 | Hibshman, II et al. |
| 2004/0200825 | A1 | 10/2004 | Ahuja |
| 2005/0076899 | A1 | 4/2005 | Hibshman, II et al. |
| 2006/0003276 | A1 | 1/2006 | Bachinski et al. |

FOREIGN PATENT DOCUMENTS

| | | |
|---|---|---|
| CN | 2180911 Y | 10/1994 |
| CN | 1196464 A | 10/1998 |
| DE | 8815513 U1 | 7/1989 |
| EP | 1447035 A1 | 8/2004 |
| FR | 944341 A | 4/1949 |
| FR | 2604776 B1 | 11/1988 |
| GB | 1424399 A | 2/1976 |
| JP | 55065834 A | 5/1980 |
| JP | 08312964 A | 11/1996 |
| JP | 11246984 A | 9/1999 |
| WO | 01/73350 A1 | 4/2001 |

OTHER PUBLICATIONS

Communication dated Aug. 3, 2010 enclosing Extended European Search Report in relation to 06721855.2-1266/2019947 PCT/CA2006/000673 completed on Jul. 23, 2010.

Yeh, T. The Optimum Concentration of Electrolytes for an Electrode Humidifier, Mar. 25, 1999, published by the Oklahome Junior Academy of Science at http://oas.ucok.edu/OJAS/99/Papers/Yeh.htm.

NREL National Renewable Technology Brief: Analysis of Current-Day Commercial Electrolysers, National Renewable Energy Laboratory, Sep. 2004, NREL/MP-560-36734, Midwest Research Institute, Colorado, USA.

International Search Report and Written Opinion issued on the corresponding International Application No. PCT/CA2006/000673, mailed on Sep. 20, 2006.

Abstract, JP11246984 A, Zipangu Energy; KK, retrieved from the LexisNexis database Sep. 14, 1999.

Ivy, Johanna, Summary of Electrolytic Hydrogen Production, Milestone Completion Report, National Renewable Energy Laboratory, pp. 1-29, Sep. 2004, NREL/MP-560-36734, Midwest Research Institute, Colorado, USA, http://www.nrel.gov/publications.

Parish, Alton, E-107 Hydrogen Generation for Fuel Cells, Business Communications, Inc., Published Dec. 2003, pp. 1-37, http://www.becresearch.com/energy/E107.html.

Abstract, JP55065834, A2, Koji et al., retrieved from the Delphion database May 17, 1980.

International Search Report and Written Opinion in relation to corresponding PCT application No. PCT/CA2006/000506, dated Jul. 24, 2006.

Abstract, CN2138760 (Y), Li Xiutai, retrieved from the European Patent Office bibliographic date Jun. 21, 1993.

Abstract, CN 2177902 (Y), Wang Shusheng, retrieved from the European Patent Office bibliographic data Sep. 21, 1994.

Abstract, CN 2180911 (y), Inst. No. 1016, retrieved from the European Patent Office bibliographic data Oct. 26, 1994.

Examination Report in relation to GB0821785.3 dated Nov. 30, 2010.

Kaz, Inc. VICKS Vaporizer Owner's Manual dated 2000 by Kaz, Incorporated, Hison NY, retrieved at http://web.archive.org/web/2003/20030629162243/kaz.com/html/PDFs/V150_2000_manual.pdf, made public Jun. 29, 2003.

Abstract, JP 8312964, EPODOC/EPO, published May 15, 1995.

* cited by examiner

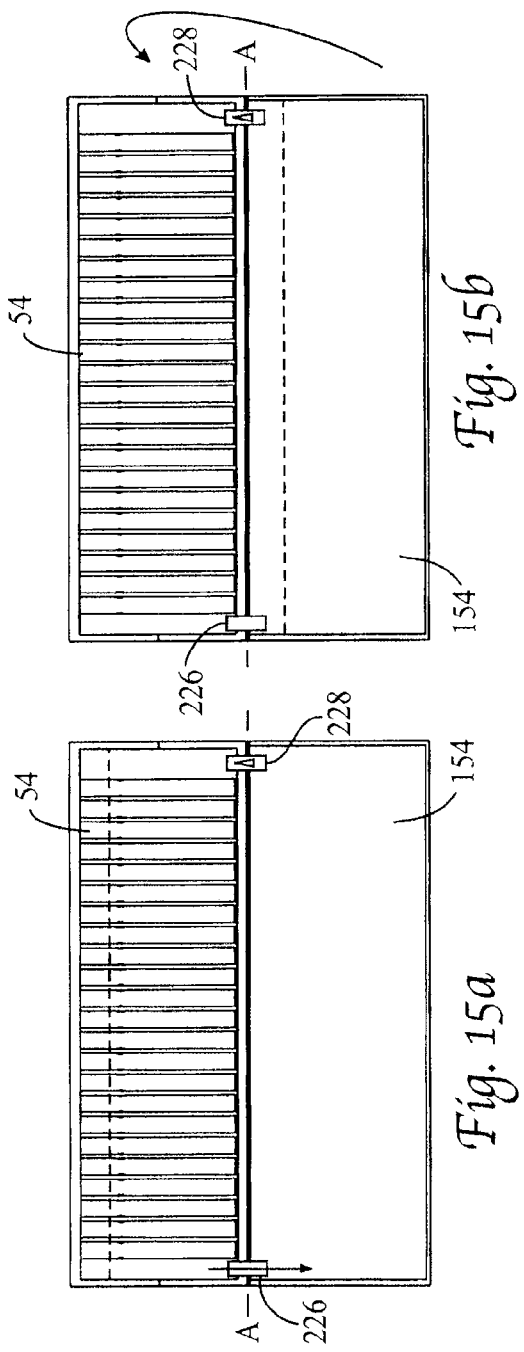

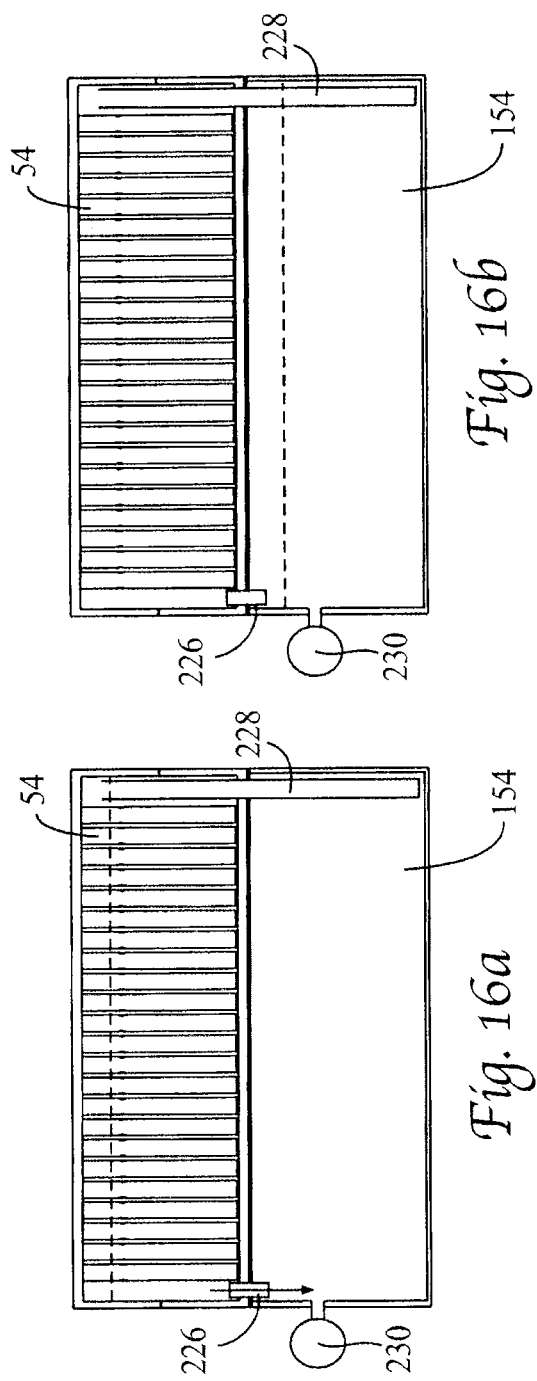

METHOD AND APPARATUS FOR COOKING USING A COMBUSTIBLE GAS PRODUCED WITH AN ELECTROLYZER

CROSS REFERENCES TO RELATED APPLICATIONS

This application claims benefit under 35 USC 120 as a divisional application of co-pending U.S. patent application Ser. No. 11/577,887, filed Apr. 25, 2007, which itself claims the benefit of 35 USC 371 based on co-pending International Patent Application No. PCT/CA2006/000673, filed May 1, 2006, which itself claims the benefit of 35 USC 119 based on the priority of co-pending U.S. Provisional Patent Application 60/676,302, filed May 2, 2005 and U.S. Provisional Patent Application No. 60/780,836 filed on Mar. 10, 2006, the specifications of which are incorporated herein by reference.

FIELD OF THE INVENTION

This invention relates to a method and apparatus to cook food. The apparatus may be portable and may use, or produce and use, a combustible gas to provide heat for cooking. Alternately, or in addition, the apparatus may use electrical contact heating to produce convective cooking of food. This invention also relates to a method and apparatus that produces a combustible gas and may store the combustible gas. The apparatus may be an indoor barbeque.

BACKGROUND OF THE INVENTION

Various types of cooking apparatus are known. These include barbeques, ovens, and gas and electric cook tops. Barbeques utilize charcoal, propane (that is stored in a tank) or natural gas as a heating source. The gas or charcoal is combusted below the cooking surface and the heat from the combustion is utilized to cook the food. Barbeque foods are popular and indoor barbeques have been developed. These typically comprise a grill that is provided as part of a cook top. The cook top includes a grill below which a natural gas burner is positioned. An exhaust system is provided adjacent (e.g., above or behind the grill) to exhaust the combustion gasses. These indoor barbeques have several disadvantages. First, they must be connected to a source of gas. If a kitchen does not already have a feed of natural gas, e.g., for a natural gas oven, then it may be difficult or impractical to retrofit an indoor barbeque into an existing kitchen. Another disadvantage is the noise of the exhaust system. The combustion products must be exhausted and the exhaust systems typically have high flow rates resulting a high noise level while cooking.

A gas barbeque that utilizes hydrogen is known. The barbeque utilizes an external pressurized hydrogen canister. The canister is removable so that, when the canister is empty, a new canister containing hydrogen may be installed. One disadvantage with this barbeque is that hydrogen is a very light gas and has a low power density. Accordingly, a canister of hydrogen that is transportable by a consumer would have a relatively small supply of hydrogen compared to propane canisters.

Existing cooking tops that use electric resistance heating or a gas burner are designed to have the food placed in a frying pan or cooking pot which is placed on or above the cooking element. The food is not placed directly in contact with the heat source. Accordingly, exiting cook tops are used for cooking food such as by frying, boiling or steaming the food.

Electrical heating cooking surfaces, which are designed to have the food placed directly on the heated surfaces, are known. These include electric frying pans, waffle irons, and cooking appliances sold under various trademarks such as George Foreman with respect to grills. In each of these cases, the food is placed on an electrically heated surface. The George Foreman appliance uses a corrugated cooking surface so as to create channels in which the fat from the food may collect while the food is cooking. Such cooking appliances do not simulate barbequed food.

Cooking appliances that use both electricity and gas to cook are known. An example is cooking appliances that include an oven that is heated by electrical resistance heating, with and without forced convection, and a gas cook top. Ovens and cook tops are also known that permit the use of gas and electric heating (see for example U.S. Pat. No. 5,275,147, United States Patent Application published under no. 2004/0200825 and Japanese Patent Application No. 55065834). These cooking appliances do not simulate barbequed food.

SUMMARY OF THE INVENTION

In accordance with one aspect of the instant invention, a cooking appliance is provided that combines electrical contact heating and convective cooking. Food may accordingly be cooked by direct contact heating as well as convection.

In accordance with another aspect of the instant invention, a cooking appliance is provided that combines electrical contact heating and cooking using a combustible fuel, preferably hydrogen.

In accordance with another aspect of the instant invention, an appliance, such as a cooking appliance, is provided that produces the combustible gas that is utilized by the cooking appliance. Some or all of the combustible gas may be used as it is produced for cooking food and some or all may be stored for later use.

In accordance with another aspect of the instant invention, a cooking apparatus is provided that is portable and may be used indoors without exhausting the combustion gases.

Various different aspects are disclosed herein which may be used singularly or in combination. In accordance with one aspect of the instant invention, there is provided a cooking apparatus comprising a member for producing a combustible fuel and a burner that is in flow communication with the member and a cooking surface on which at least one of food or a cooking container is receivable.

In one embodiment, the member is an electrolyzer.

In another embodiment, the cooking appliance further comprises a hydrogen storage member in flow communication with the electrolyzer.

In another embodiment, the cooking appliance is portable.
In another embodiment, the cooking appliance further comprises a cooking region wherein at least one portion of the cooking region is open at all times when the cooking appliance is in use.

In another embodiment, the cooking surface comprises a food receiving surface.

In another embodiment, the cooking appliance has a plug which is removably receivable in a domestic electric outlet.

In accordance with one aspect of the instant invention, there is provided a cooking appliance having an electrolyzer, the cooking appliance comprising:
  (a) a spine; and
  (b) a cooking surface;
  wherein the cooking surface is mounted to the spine.

In one embodiment, the cooking appliance further comprises a lid mounted on the spine.

In another embodiment, the cooking appliance further comprises a drip tray mounted on the spine.

In another embodiment, the cooking surface is removably mounted to the spine.

In another embodiment, the cooking surface is electrically heated.

In another embodiment, the cooking surface comprises a food receiving surface and an electrical heating member.

In another embodiment, the food receiving surface and the electrical heating member comprise a unitary assembly.

In another embodiment, the food receiving surface is removable mounted on the electrical heating member and the electrical heating member is mounted to the spine.

In another embodiment, the cooking surface has an electrical heating element, the cooking appliance has electric contacts and the cooking surface is removably mounted to the electrolyzer and the electrical heating element is connected to the electric contacts upon being mounted to the spine.

In another embodiment, the cooking surface has an electrical heating element, the cooking surface has a first mounting member, the spine has a second mounting member, the first and second mounting members inter-engage whereby when the first and second mounting members inter-engage, the cooking surface is mounted to the spine and the electrical heating element is electrically connected to the cooking appliance.

In another embodiment, and the first and second mounting members include electrically conductive members.

In accordance with another aspect of the instant invention, there is provided a domestic apparatus comprising:
(a) an electrolyzer; and
(b) a water impermeable open topped container positioned below the electrolyzer.

In one embodiment, the container has a volume and the electrolyzer has a liquid volume and the volume of the container is at least the same size as the volume of the electrolyzer.

In another embodiment, the container is removable.

In another embodiment, the container is removably mounted to a spine and the electrolyzer comprises the spine.

In another embodiment, the domestic apparatus further comprises a cooking surface and the container is sized such that it extends underneath all of the cooking surface.

In another embodiment, the container comprises a removable drip tray.

In another embodiment, the cooking surface comprises a food receiving surface.

In another embodiment, the electrolyzer has a drain port and the container is positioned below the outlet port.

In another embodiment, the outlet port comprises a drain plug.

In another embodiment, the domestic apparatus comprises a cooking appliance.

In another embodiment, the domestic apparatus comprises a charger that removable receives a hydrogen storage media.

In another embodiment, the hydrogen storage media comprises at least one of a metal hydride, carbon tubes, a hydrogen salt, a metal salt, a magnesium hydride, a micro-porous oxide, a metal nitride and zeolite In another embodiment, the hydrogen storage media is removably receivable in at least one of a garden tool, a power tool, a pressure washer and a car jack.

In accordance with another aspect of the instant invention, there is provided a cooking appliance comprising:
(a) an electrolyzer which produces a combustible fuel;
(b) a lower cooking surface which comprises a food receiving surface; and,
(c) an upper cooking member positioned above the lower cooking surface.

In one embodiment, the lower cooking surface has openings provided therein.

In another embodiment, the upper cooking member has openings provided therein.

In another embodiment, the cooking appliance further comprises a gas burner positioned below the cooking surface wherein the burner is downstream from the electrolyzer.

In another embodiment, the lower cooking surface is electrically heated by an electrical heating member.

In another embodiment, the lower cooking surface and the electrical heating member comprise a unitary assembly.

In another embodiment, the lower cooking surface is removable mounted on the electrical heating member and the electrical heating member is mounted to the cooking appliance.

In another embodiment, the lower cooking surface is removably mounted to the cooking appliance.

In another embodiment, the lower cooking surface is removably connectable to a mount provided in the cooking appliance and the lower cooking surface is configured to be electrically connected to the cooking appliance when the lower cooking surface is connected to the mount.

In another embodiment, the upper cooking member is removably mounted to the cooking appliance.

In another embodiment, the upper cooking member is electrically heated.

In another embodiment, the upper cooking member is removably connectable to a mount provided in the cooking appliance and the upper cooking member is configured to be electrically connected to the cooking appliance when the upper cooking member is connected to the mount.

In another embodiment, the upper cooking member is heated by combustion of the combustible fuel.

In another embodiment, the upper cooking member is heated by combustion products produced by combustion of the combustible fuel.

In another embodiment, the lower cooking surface and the upper heating member are spaced apart to define a cooking region therebetween and the cooking appliance further comprises a fan to produce forced convection in the cooking region.

In another embodiment, the upper cooking member includes a cooking surface.

In another embodiment, the cooking appliance is portable.

In another embodiment, the cooking appliance further comprises a plug which is removably receivable in a domestic electric outlet.

In accordance with another aspect of the instant invention, there is provided a cooking appliance comprising:
(a) an electrolyzer which produces a combustible fuel;
(b) a lower cooking surface; and,
(c) an upper member positioned above the lower cooking surface, the upper member is reflective to infrared radiation and is positioned and configured to reflect infrared radiation received thereon towards the lower cooking surface.

In one embodiment, the upper member incorporates aluminium.

In another embodiment, the lower surface of the upper member has aluminium provided thereon.

In another embodiment, the upper member comprises a lid.

In another embodiment, the lower surface of the lid is treated to be reflective to infrared radiation.

In another embodiment, the cooking appliance further comprises an upper cooking member positioned above the lower cooking surface and below the upper member wherein the upper cooking member has openings provided therein.

In another embodiment, the upper cooking member includes a cooking surface.

In another embodiment, the cooking appliance further comprises a gas burner positioned below the cooking surface wherein the burner is connected to a gas outlet of the electrolyzer.

In another embodiment, the lower cooking surface has openings provided therein.

In another embodiment, the lower cooking surface and the upper member are spaced apart to define a cooking region therebetween and the cooking region has a vertical height of 1/16 to 4 inches.

In another embodiment, the cooking region has a vertical height of 1/4 to 2 inches.

In another embodiment, the cooking region has a vertical height of 3/4 to 1.5 inches.

In another embodiment, the lower cooking surface and the upper cooking member are spaced apart to define a cooking region therebetween and the cooking region has a vertical height of 1/16 to 4 inches.

In another embodiment, the cooking region has a vertical height of 1/4 to 2 inches.

In another embodiment, the cooking region has a vertical height of 3/4 to 1.5 inches.

In another embodiment, the upper member is moveably mounted between a closed position in which it is positioned over the lower cooking surface and an open position.

In another embodiment, the cooking appliance is portable.

In another embodiment, the cooking appliance further comprises a plug which is removably receivable in a domestic electric outlet.

In another embodiment, the lower cooking surface comprises a food receiving surface.

In another embodiment, at least a portion of the upper member is transparent.

A In accordance with another aspect of the instant invention, there is provided a cooking appliance comprising:
(a) an electrolyzer which produces a combustible fuel that is used to cook food;
(b) a lower cooking surface; and,
(c) a lid positioned above the lower cooking surface, at least a portion of the lid is transparent.

In one embodiment, the lid is moveably mounted between a closed position in which it is positioned over the lower cooking surface and an open position.

In another embodiment, the lid is rotatably mounted to the cooking appliance.

In another embodiment, the cooking appliance further comprises a burner for the combustible fuel.

In another embodiment, the cooking appliance further comprises a cooking region above the lower cooking surface and combustion of the combustible fuel produce heat that heats the cooking region.

In another embodiment, the lower cooking surface comprises a food receiving surface.

In another embodiment, the lower cooking surface is electrically heated.

In another embodiment, at least a portion of the lid is transparent to visible light and at least o portion of the lid reflects infrared radiation.

In another embodiment, the lid has a lower surface at least a portion of which has a coating applied thereto that is transparent to visible light and reflects infrared radiation.

In another embodiment, the lower surface is aluminized.

In another embodiment, the cooking appliance is portable.

In another embodiment, the cooking appliance further comprises a plug which is removably receivable in a domestic electric outlet.

In accordance with another aspect of the instant invention, there is provided a cooking appliance comprising:
(a) an electrolyzer which produces a combustible fuel;
(b) a lower cooking surface;
(c) an upper member positioned above the lower cooking surface to define a cooking region between the lower cooking surface and the upper member;
(d) a filtration member; and,
(e) a fan positioned to cause air to pass through the filtration member.

In one embodiment, the filtration member comprises a porous filter media.

In another embodiment, the filtration member comprises a cyclone.

In another embodiment, the filtration member comprises an electrostatic filter.

In another embodiment, the upper member comprises a lid.

In another embodiment, the lid is moveably mounted between a closed position in which it is positioned over the lower cooking surface and an open position.

In another embodiment, the lid is rotatably mounted to the cooking appliance.

In another embodiment, the cooking appliance further comprises a burner for the combustible fuel.

In another embodiment, the cooking appliance is portable.

In another embodiment, the cooking appliance further comprises a plug which is removably receivable in a domestic electric outlet.

In accordance with another aspect of the instant invention, there is provided a cooking appliance comprising:
(a) an electrolyzer which produces a combustible fuel that is used to cook food;
(b) a lower cooking surface; and,
(c) a lid positioned above the lower cooking surface and moveably mounted between a closed position in which it is positioned over the lower cooking surface and an open position.

In one embodiment, the lid is rotatably mounted to the cooking appliance.

In another embodiment, the cooking appliance further comprises a burner for the combustible fuel.

In another embodiment, the cooking appliance further comprises a cooking region above the lower cooking surface and combustion of the combustible fuel produces heat that heats the cooking region.

In another embodiment, the lower cooking surface comprises a food receiving surface.

In another embodiment, the lower cooking surface is electrically heated.

In another embodiment, at least a portion of the lid is transparent to visible light and at least o portion of the lid reflects infrared radiation.

In another embodiment, the lid has a lower surface at least a portion of which has a coating applied thereto that is transparent to visible light and reflects infrared radiation.

In another embodiment, the lid is removably mounted to the cooking appliance.

In another embodiment, the cooking appliance is portable.

In another embodiment, the cooking appliance further comprises a plug which is removably receivable in a domestic electric outlet.

In accordance with another aspect of the instant invention, there is provided a cooking appliance comprising:

(a) an electrolyzer which produces a combustible fuel; and,
(b) a cooking surface on which food is receivable for cooking, wherein the cooking surface is removably mounted to the cooking appliance.

In one embodiment, the cooking appliance further comprises a lid.

In another embodiment, the cooking surface is electrically heated by an electrical heating member.

In another embodiment, the cooking surface and the electrical heating member comprise a unitary assembly.

In another embodiment, the cooking surface is removable mounted on the electrical heating member and the electrical heating member is mounted to the cooking appliance.

In another embodiment, the cooking surface has an electrical heating element, the cooking appliance has electric contacts and the cooking surface is removably mounted to the cooking appliance and the electrical heating element is connected to the electric contacts upon being mounted to the cooking appliance.

In another embodiment, the cooking surface has an electrical heating element, the cooking surface has a first mounting member, the electrolyzer has a second mounting member, the first and second mounting members inter-engage whereby when the first and second mounting members inter-engage, the cooking surface is mounted to the cooking appliance and the electrical heating element is electrically connected to the cooking appliance.

In another embodiment, and the first and second mounting members include electrically conductive members.

In another embodiment, the cooking appliance is portable.

In another embodiment, the cooking appliance further comprises a plug which is removably receivable in a domestic electric outlet.

In accordance with another aspect of the instant invention, there is provided a domestic apparatus comprising a plurality of electrolyzers, wherein each electrolyzer has a plurality of electrodes, the household appliance having a volume, the volume being smaller than if the same domestic apparatus would have if comprised a single electrolyzer having the same number of electrodes as in the plurality of electrolyzers.

In one embodiment, the domestic apparatus has a length and a width defining a footprint, the footprint being smaller than if the same domestic apparatus would have if comprised a single electrolyzer having the same number of electrodes as in the plurality of electrolyzers.

In another embodiment, at least two electrolyzers are electrically connected in series.

In another embodiment, at least two electrolyzers are electrically connected in parallel.

In another embodiment, at least two electrolyzers are positioned front to rear.

In another embodiment, at least one electrolyzer is positioned above a second electrolyzer.

In accordance with another aspect of the instant invention, there is provided a domestic apparatus comprising at least one elecytolyzer, at least one burner positioned in a combustion region, a hydrogen gas flow path extending between the electrolyzer and the burner and a fan positioned to direct air into the combustion region.

In one embodiment, hydrogen gas has an explosive threshold concentration and the fan directs sufficient air to the combustion region to reduce the concentration of hydrogen in the combustion region to below the explosive threshold concentration.

In another embodiment, the fan directs sufficient air to the combustion region to reduce the concentration of hydrogen in the combustion region to less than half the explosive threshold concentration.

In another embodiment, the fan directs sufficient air to the combustion region to reduce the concentration of hydrogen in the combustion region to less then a tenth of the explosive threshold concentration.

In another embodiment, the fan is automatically actuated when the electrolyzer is actuated.

In another embodiment, the domestic apparatus further comprises a hydrogen storage member and the hydrogen gas flow path comprises a first passage extending between the electrolyzer and the hydrogen storage member and a second passage extending between the hydrogen storage member and the burner and the fan also directs air to a storage region in which the hydrogen storage member is positioned.

In another embodiment, hydrogen gas has an combustion threshold concentration and the fan directs sufficient air to the storage region to reduce the concentration of hydrogen in the storage region to below the combustion threshold concentration.

In accordance with another aspect of the instant invention, there is provided a cooking appliance comprising:
(a) an electrolyzer which produces a combustible fuel;
(b) a burner;
(c) a combustible fuel flow path extending between the electrolyzer and the burner;
(d) a lower cooking surface on which food is receivable for cooking; and,
(e) an upper member positioned above the lower cooking surface wherein at least one of the lower cooking surface and the upper member is moveable relative to the other.

In one embodiment, the upper member is a lid.

In another embodiment, the upper member is a heating member.

In another embodiment, at least one of the lower cooking member and the upper member is vertically moveable.

In another embodiment, the upper member is moveably mounted between a closed position in which it is positioned over the lower cooking surface and an open position.

In another embodiment, the upper member is rotatably mounted to the cooking appliance.

In another embodiment, the lower cooking surface is electrically heated.

In another embodiment, the burner is positioned below the lower cooking surface.

In another embodiment, the lower cooking member is vertically adjustable relative to the burner.

In another embodiment, the upper member is removably mounted to the cooking appliance.

In another embodiment, the cooking appliance is portable.

In another embodiment, the cooking appliance further comprises a plug which is removably receivable in a domestic electric outlet.

In accordance with another aspect of the instant invention, there is provided a cooking appliance comprising:
(a) an elecytolyzer;
(b) a burner;
(c) a combustible fuel flow path extending between the electrolyzer and the burner;
(d) a lower cooking surface;
(e) a drip tray; and,
(f) a circuit electrically connecting the electrolyzer to a power source, the circuit including a detector wherein at least one of the lower cooking surface and the drip tray is removable mounted to the cooking appliance, the detector detects the presence of at least one of the lower cooking surface and the drip tray in the cooking appliance, the circuit isolates the electrolyzer from the power source when at least one of the lower cooking surface and the drip tray is removed from the cooking appliance.

In one embodiment, the power source comprises a plug which is removably receivable in a domestic electric outlet.

In another embodiment, the lower cooking surface comprises a food receiving surface.

In another embodiment, the lower cooking surface incorporates an electrical heating member.

In another embodiment, the cooking surface has an electrical heating element, the detector comprises electric contacts and the electrical heating element is connected to the electric contacts upon being mounted to the cooking appliance.

In another embodiment, the cooking surface has a first mounting member, the cooking appliance has a second mounting member that includes the electric contacts, the first and second mounting members inter-engage whereby when the first and second mounting members inter-engage, the cooking surface is mounted to the cooking appliance and the electrical heating element is electrically connected to the cooking appliance.

In another embodiment, the cooking appliance is portable.

In accordance with another aspect of the instant invention, there is provided a domestic apparatus comprising an electrolyzer which produces hydrogen, a burner positioned in a combustion region, a hydrogen gas flow path extending between the electrolyzer and the burner and an illumination member which illuminates the combustion region.

In one embodiment, the illumination member comprises a member positioned in the combustion region and which emits light when heated.

In another embodiment, the illumination member is combustible.

In another embodiment, the illumination member is non-combustible.

In another embodiment, the illumination member is one or more of a light emitting diode, an incandescent bulb, a fluorescent bulb, or a combination thereof.

In another embodiment, the illumination member comprises an element included in the hydrogen that is combusted.

In another embodiment, the element is incorporated into an electrolyte solution in the electrolyzer.

In another embodiment, the hydrogen gas flow path includes a sparger and the element is in a liquid in the sparger.

In another embodiment, in operation, a flame is produced by the burner and the illumination member comprises a mirror that is positioned to reflect an image of the flame towards a user.

In accordance with another aspect of the instant invention, there is provided a cooking appliance comprising:
 (a) an elecytolyzer;
 (b) a heat source;
 (c) a cooking region heated by the heat source; and,
 (d) a cooking support member positioned in the cooking region
 wherein at least one of the heat source and the cooking support member is moveable.

In one embodiment, cooking support comprises a rod for a rotisserie wherein the rod is rotatably mounted.

In another embodiment, the cooking support comprises a food receiving surface.

In another embodiment, at least one of the heat source and the cooking surface is vertically moveable.

In another embodiment, the heat source comprises a burner.

In another embodiment, the heat source further comprises an electric heating member.

In another embodiment, the burner and electric heating member are operable simultaneously.

In another embodiment, at least one of the burner and the electric heating member is vertically moveable.

In another embodiment, the cooking support comprises a food receiving surface and the electric heating member is incorporated into the cooking surface.

In another embodiment, the cooking appliance is portable.

In another embodiment, the cooking appliance further comprises a plug which is removably receivable in a domestic electric outlet.

In accordance with another aspect of the instant invention, there is provided a cooking appliance comprising:
 (a) an electrolyzer which produces a combustible gas;
 (b) a heat source comprising a burner which produces a flame when the combustible gas is combusted;
 (c) a cooking region heated by the heat source, the cooking region having a cooking temperature that is adjustable; and,
 (d) a cooking support member positioned in the cooking region and spaced from the heat source by a distance
 wherein the cooking temperature is adjustable.

In one embodiment, the cooking temperature is adjustable by varying at least one of:
 (a) the temperature of the heat source; and,
 (b) the temperature in the cooking region.

In another embodiment, the cooking temperature is adjustable by:
 (a) varying the distance between the heat source and the cooking support member;
 (b) providing dilution air to the cooking region;
 (c) varying an amount of dilution air to the cooking region;
 (d) varying the amount of combustible gas produced by the electrolyzer; and,
 (e) varying the size of the flame.

In another embodiment, the heat source further comprises an electric heating element.

In another embodiment, the distance between the cooking support member and at least one of the burner and the electric heating element is variable.

In another embodiment, the burner and electric heating member are operable simultaneously.

In another embodiment, cooking support member comprises a rod for a rotisserie.

In another embodiment, the cooking support member comprises a food receiving surface.

In another embodiment, the heat source further comprises an electric heating element positioned to heat the cooking surface.

In another embodiment, the power provided to the electric heating element is adjustable.

In another embodiment, the cooking temperature is adjustable by varying the power provided to the electrolyzer.

In another embodiment, the burner has an orifice and the cooking temperature is adjustable by varying the size of the orifice.

In another embodiment, a dilution gas is combined with the combustible gas and the cooking temperature is adjustable by varying the amount of dilution gas combined with the combustible gas.

In another embodiment, the heat source further comprises an electric heating element and the power provided to the electric heating element and the heat produced by the burner are variable.

In another embodiment, the power provided to the electric heating element and the heat produced by the burner are individually variable.

In another embodiment, the heat produced by the burner is varied by at least one of:
(a) varying the amount of combustible gas produced by the electrolyzer; and,
(b) varying the size of the flame.

In another embodiment, the cooking support member comprises a food receiving surface.

In another embodiment, the cooking temperature is automatically adjustable based on at least one of the temperature of food in the cooking region, the temperature of the cooking region and the temperature of the cooking surface.

In another embodiment, the cooking appliance is portable.

In another embodiment, the cooking appliance further comprises a plug which is removably receivable in a domestic electric outlet.

In accordance with another aspect of the instant invention, there is provided a domestic apparatus comprising at least one elecytolyzer, at least one burner, a hydrogen storage member and a first hydrogen gas flow path extending between the electrolyzer and the hydrogen storage member and a second hydrogen gas flow path extending between the hydrogen storage member and the burner.

In one embodiment, the domestic apparatus further comprises a third hydrogen gas flow path extending between the electrolyzer and the burner.

In another embodiment, the burner concurrently combusts hydrogen obtained from the electrolyzer and hydrogen obtained from the hydrogen storage member.

In another embodiment, the hydrogen storage member comprises a hydrogen storage media.

In another embodiment, the hydrogen storage media comprises at least one of a metal hydride, carbon tubes, a hydrogen salt, a metal salt, a magnesium hydride, a micro-porous oxide, a metal nitride and zeolite.

In another embodiment, the hydrogen storage media releases hydrogen upon application of current and the domestic apparatus further comprises an electric conductive member connecting the hydrogen storage media to a source of current.

In another embodiment, the electric conductive member connects the hydrogen storage media to a variable source of current.

In another embodiment, the hydrogen storage media releases hydrogen upon application of heat and the domestic apparatus further comprises an electric heating element thermally connected to the hydrogen storage media.

In another embodiment, the power provided to the electric heating element is variable whereby the amount of hydrogen provided by the hydrogen storage media per unit time is varied by varying the power provided to the electric heating element.

In another embodiment, the domestic appliance comprises a cooking appliance.

In another embodiment, the cooking appliance is portable.

In another embodiment, the domestic apparatus further comprises a plug which is removably receivable in a domestic electric outlet.

In accordance with another aspect of the instant invention, there is provided a method of providing heat in a domestic apparatus comprising at least one elecytolyzer, at least one burner and a hydrogen storage media, the method comprising:
(a) obtaining hydrogen from at least one of the electrolyzer and the hydrogen storage media; and,
(b) combusting the hydrogen to produce heat.

In one embodiment, the method further comprises operating the electrolyzer when heat is not required and storing hydrogen produced by the electrolyzer in the hydrogen storage member.

In another embodiment, the domestic apparatus has a plug that is removably receivable in a domestic electric outlet and the method further comprises removing the plug from the domestic electric outlet and combusting hydrogen obtained from the hydrogen storage member.

In another embodiment, the domestic apparatus has a battery and the method further comprises charging the battery when the plug is received in the domestic electric outlet and utilizing power stored in the battery to release hydrogen from the hydrogen storage member.

In another embodiment, the hydrogen storage member comprises a hydrogen storage media which releases hydrogen upon application of heat and the method further comprises utilizing power stored in the battery to heat the hydrogen storage media whereby hydrogen is released from the hydrogen storage media.

In another embodiment, the domestic apparatus comprises a cooking appliance and the method further comprises using the heat to cook food.

In accordance with another aspect of the instant invention, there is provided a cooking appliance comprising:
(a) an electrolyzer which produces a combustible fuel that is combusted in a combustion region;
(b) a lower cooking surface
(c) a cooking region; and,
(d) a flavouring agent container.

In one embodiment, the cooking appliance further comprises a lid positioned above the lower cooking surface, In another embodiment, the flavouring agent container is heat stable and is positioned in or above the combustion region.

In another embodiment, the flavouring agent comprises a liquid and the flavouring agent container is configured to deliver the flavouring agent to at least one of the combustion region, a position above the combustion region and to food in the cooking region.

In another embodiment, the cooking surface comprises a food receiving surface.

In accordance with another aspect of the instant invention, there is provided a cooking appliance comprising:
(a) an electrolyzer which produces a combustible fuel;
(b) a gas burner downstream from the electrolyzer, the gas burner having burner ports; and,
(c) a cooking surface having openings provided therein, the cooking surface positioned above the burner and configured to direct liquid produced when food is cooked away from the burner ports.

In one embodiment, the cooking surface comprises a food receiving surface.

In another embodiment, the food receiving surface is generally corrugated in shape.

In another embodiment, the corrugations are generally V shaped.

In another embodiment, the cooking surface is removably mounted to the cooking appliance.

In another embodiment, the cooking surface is electrically heated.

In another embodiment, the cooking surface comprises a food receiving surface and an electrical heating member.

In another embodiment, the food receiving surface and the electrical heating member comprise a unitary assembly.

In another embodiment, the food receiving surface is removably mounted on the electrical heating member.

In another embodiment, the cooking appliance further comprises a plug which is removably receivable in a domestic electric outlet.

In another embodiment, the electrolyzer comprises a spine of the cooking appliance.

In accordance with another aspect of the instant invention, there is provided a domestic apparatus comprising an electrolyzer which produces hydrogen, a burner positioned in a combustion region, a hydrogen gas flow path extending between the electrolyzer and the burner and a sparger positioned in the hydrogen gas flow path.

In one embodiment, the domestic apparatus further comprises a hydrogen storage member.

In another embodiment, the hydrogen storage member comprises at least one of a pressurized storage container and a hydrogen storage media.

In another embodiment, the hydrogen gas flow path comprises a first flow path that extends from the electrolyzer to the hydrogen storage member and a second flow path that extends from the hydrogen storage member to the burner and the sparger is positioned in the second flow path.

In another embodiment, the hydrogen gas flow path comprises a third flow path that extends from the electrolyzer to the burner.

In another embodiment, the third flow path mergers with the second flow path upstream of the sparger.

In another embodiment, the third flow path includes a sparger.

In another embodiment, the domestic apparatus comprises a charger that removably receives a hydrogen storage member.

In another embodiment, the hydrogen storage member is removably receivable in a garden tool or a power tool.

In another embodiment, the domestic apparatus comprises a household appliance.

In another embodiment, the domestic apparatus comprises a cooking appliance.

In another embodiment, the domestic apparatus is portable.

In another embodiment, the domestic apparatus further comprises a plug which is removably receivable in a domestic electric outlet.

In another embodiment, the sparger has an inlet port that is positioned to be accessible when the domestic apparatus is assembled.

In another embodiment, the domestic apparatus has an outer casing and the sparger has an inlet port that is positioned on the outer casing.

In another embodiment, the inlet port has a removable cap and the domestic apparatus has a sparger liquid level indicator.

In another embodiment, the inlet port has a removable cap and a liquid level warning member whereby a person may refill the appliance when the liquid level warning member signals that the liquid in the sparger has dropped below a predetermined level.

In accordance with another aspect of the instant invention, there is provided a method of cleaning a cooking appliance having a cooking surface on which food is receivable for cooking and at least one of an electrolyzer and a hydrogen storage media, the method comprising:

(a) allowing the cooking appliance to cool;
(b) removing the cooking surface; and,
(c) cleaning the cooking surface in a dishwasher or a sink.

In one embodiment, the cooking appliance includes at least one of an upper cooking member, a lid and a drip tray and the method further comprises removing the at least one of an upper cooking member, a lid and a drip tray for cleaning.

In another embodiment, the method further comprises an electric heating element that is removable from the cooking appliance and the method further comprises electrically disconnecting the electric heating element while removing the electric heating element from the cooking appliance.

In another embodiment, the cooking surface has a mounting member for releasably connecting the cooking member to the cooking appliance, the electric heating element is removable with the cooking surface and is electrically connected to the cooking appliance by the mounting member and the method further comprises electrically disconnecting the electric heating element while removing the cooking surface from the cooking appliance.

In another embodiment, the cooking surface that is removably mounted on an electrical heating member and step (b) comprises removing the cooking surface from the electrical heating member.

In another embodiment, the electrical heating member is maintained in the cooking appliance during normal cleaning and step (b) further comprises maintaining the electrical heating member in the cooking appliance while the cooking surface is removed for cleaning.

In another embodiment, the cooking surface and the electrical heating member comprise a unitary assembly and step (b) comprises removing the cooking surface and the electrical heating member.

In accordance with another aspect of the instant invention, there is provided a method of cleaning a portable cooking appliance comprising at least one of an electrolyzer and a hydrogen storage media, the method comprising:

(a) allowing the cooking appliance to cool;
(b) removing the cooking surface; and,
(c) cleaning the cooking surface in a dishwasher or a sink.

In one embodiment, the cooking appliance includes at least one of an upper cooking member, a lid and a drip tray and the method further comprises removing the at least one of an upper cooking member, a lid and a drip tray for cleaning.

In another embodiment, the method further comprises an electric heating element that is removable from the cooking appliance and the method further comprises electrically disconnecting the electric heating element while removing the electric heating element from the cooking appliance.

In another embodiment, the cooking surface has a mounting member for releasably connecting the cooking member to the cooking appliance, the electric heating element is removable with the cooking surface and is electrically connected to the cooking appliance by the mounting member and the method further comprises electrically disconnecting the electric heating element while removing the cooking surface from the cooking appliance.

In accordance with another aspect of the instant invention, there is provided a method of cooking food comprising:

(a) actuating an electrolyzer to produce hydrogen;
(b) combusting the hydrogen to produce heat and utilizing the heat to cook food; and,
(c) utilizing electricity to produce additional heat to cook food.

In one embodiment, steps (b) and (c) are conducted simultaneously.

In another embodiment, step (c) comprises utilizing electricity to heat a cooking surface.

In another embodiment, the method further comprises placing food on the cooking surface.

In accordance with another aspect of the instant invention, there is provided a method of cooking food in a portable cooking appliance comprising:
  (a) actuating an electrolyzer to produce hydrogen;
  (b) combusting the hydrogen to produce heat; and
  (c) utilizing the heat to cook food.

In one embodiment, the method further comprises utilizing electricity to produce additional heat to cook food.

In another embodiment, the method further comprises concurrently combusting the hydrogen to produce heat and utilizing electricity to produce additional heat to cook food.

In another embodiment, the method further comprises utilizing electricity to heat a cooking surface.

In another embodiment, the method further comprises placing food on the cooking surface.

In another embodiment, the method further comprises placing food on a rotisserie in the cooking appliance.

In another embodiment, the portable cooking appliance has a plug which is receivable in a domestic electric outlet and the method further comprises inserting the plug in the domestic electric outlet prior to actuating the electrolyzer.

In accordance with another aspect of the instant invention, there is provided a cooking appliance comprising a discontinuous electrically heated cooking surface that has a plurality of surface portions, the surface portions are laterally spaced apart to define a gap between adjacent laterally spaced apart surface portions, the gaps are dimensioned to permit convective air currents to be formed therein.

In one embodiment, the convective air currents have a rise rate of 1 to 1000 inches per second.

In another embodiment, the gaps comprise openings in the cooking surface and the cooking appliance further comprises at least one burner positioned below the cooking surface.

In another embodiment, the cooking appliance includes a member for producing a combustible fuel that is fed to the at least one burner.

In another embodiment, the member is an electrolyzer.

In another embodiment, the cooking appliance further comprises at least one container in flow communication with the electrolyzer wherein the at least one container stores gas produced by the electrolyzer.

In another embodiment, the cooking appliance is portable.

In accordance with another aspect of the instant invention, there is provided a method of cooking food comprising:
  (a) placing food on a surface that is electrically heated; and,
  (b) providing hydrogen gas from at least one of an electrolyzer and a hydrogen storage media; and,
  (c) burning a gas to provide additional heat to cook the food.

In one embodiment, the method further comprises using an electrolyzer to produce hydrogen gas.

In another embodiment, the method further comprises storing at least a portion of the hydrogen gas.

In another embodiment, the method further comprises combusting at least a portion of the stored hydrogen to cook the food.

In another embodiment, the method further comprises utilizing only the stored hydrogen to cook the food.

In another embodiment, the method further comprises operating the electrolyzer to produce hydrogen and simultaneously combusting hydrogen that has been stored and hydrogen that is produced by the electrolyzer to cook the food.

In another embodiment, the method is conducted using a cooking appliance that has a plug which is removably receivable in a domestic electric outlet and the method further comprises inserting the plug into the domestic electric outlet.

In another embodiment, the method is conducted using a cooking appliance that has a plug which is removably receivable in a domestic electric outlet, a battery and a hydrogen storage member and the method further comprises operating the electrolyzer while the plug is inserted in a domestic electric outlet to at least partially charge the hydrogen storage member, removing the plug from the domestic electric outlet and operating the cooking appliance using the battery.

In accordance with another aspect of the instant invention, there is provided a method of cooking food comprising:
  (a) obtaining a combustible fuel in a cooking appliance from at least one of an electrolyzer and a hydrogen storage media;
  (b) burning the combustible fuel to heat a cooking region; and,
  (c) placing the food on at least one of a cooking surface in the cooking region, a rod of a rotisserie in the cooking region and a cooking container placed on a cooking surface provided in the cooking region.

In one embodiment, the method further comprises storing at least a portion of the combustible fuel prior to burning the combustible fuel to produce heat.

In another embodiment, the method further comprises placing food on a surface that is electrically heated while the food is also being cooked by the heat from the combustion of the combustible fuel.

In another embodiment, the method is conducted using a cooking appliance that has a plug which is removably receivable in a domestic electric outlet and the method further comprises inserting the plug into the domestic electric outlet.

In another embodiment, step (c) comprises placing the food on a cooking surface in the cooking region.

In another embodiment, step (c) comprises placing the food on a rotisserie in the cooking region.

In another embodiment, at least a portion of the cooking region is open at all times and step (c) comprises placing the food in a cooking container placed on a cooking surface provided in the cooking region.

In accordance with another aspect of the instant invention, there is provided a cooking appliance comprising:
  (a) a source of hydrogen gas comprising at least one of an electrolyzer and a hydrogen storage media; and,
  (b) an electrical heating element positioned to heat a cooking surface.

In one embodiment, the cooking appliance further comprises an electrolyzer

In another embodiment, the appliance is portable.

In another embodiment, the appliance is operated on household electric current.

In another embodiment, the appliance has a plug which is removably receivable in a domestic electric outlet.

In accordance with another aspect of the instant invention, there is provided a domestic apparatus comprising an electrolyzer, wherein the electrolyzer comprises at least one gas outlet port, at least one fluid inlet port and the domestic apparatus has at least one drain port in fluid communication with the electrolyzer.

In another embodiment, the drain port is positioned to be accessible when the electrolyzer is positioned in the domestic apparatus.

In another embodiment, the domestic apparatus has an outer casing and the drain port is positioned on the outer casing.

In another embodiment, the domestic apparatus has an outer surface and the drain port is positioned to be accessible from the outer surface.

In another embodiment, the domestic appliance further comprises a reservoir in fluid communication with the electrolyzer and the drain port is provided in at least one of the electrolyzer and the reservoir or a conduit extending from at least one of the electrolyzer and the reservoir.

In accordance with another aspect of the instant invention, there is provided a domestic apparatus comprising:
(a) an electrolyzer;
(b) a liquid reservoir in fluid flow communication with the electrolyzer;
(c) at least one of the electrolyzer, the liquid reservoir and a flow passage between the electrolyzer and the reservoir has an openable inlet port; and,
(d) a burner for gas produced by the electrolyzer.

In one embodiment, liquid reservoir has the inlet port.

In another embodiment, the domestic apparatus has an outer casing and the inlet port is positioned on the outer casing.

In another embodiment, the domestic apparatus has an outer surface and the inlet port is positioned to be accessible from the outer surface.

In another embodiment, the inlet port has a removable cap and the domestic apparatus further comprises a liquid level indicator.

In another embodiment, the inlet port has a removable cap and the domestic apparatus further comprises a liquid level warning member whereby a person may refill the reservoir when the liquid level warning member signals that the liquid in at least one of the electrolyzer and the reservoir has dropped below a predetermined level.

In another embodiment, the liquid reservoir has a volume that is at least as large as the liquid volume of the electrolyzer.

In another embodiment, the liquid reservoir is constructed to remain watertight when liquid freezes therein.

In another embodiment, at least one of the electrolyzer and the liquid reservoir is moveable with respect to the other so as to be positioned below the other whereby when the liquid reservoir is positioned below the electrolyzer, electrolyte solution may flow due to gravity from the electrolyzer to the liquid reservoir and when the electrolyzer is positioned below the liquid reservoir, electrolyte solution may flow due to gravity from the liquid reservoir to the electrolyzer.

In another embodiment, the electrolyzer and the liquid reservoir are connected together in an assembly and the assembly is rotatably mounted.

In another embodiment, one of the electrolyzer and the liquid reservoir is mounted to the other of the electrolyzer and the liquid reservoir.

In another embodiment, the electrolyzer and the liquid reservoir are rotatably mounted about a generally horizontal axis of rotation.

In another embodiment, the electrolyzer and the generally horizontal axis of rotation is positioned about midway in an assembly of the electrolyzer and the liquid reservoir.

In accordance with another aspect of the instant invention, there is provided a method comprising:
(a) providing an apparatus comprising an electrolyzer, a fluid reservoir and a first fluid flow path extending between the electrolyzer and the fluid reservoir, at least one of the electrolyzer and the liquid reservoir is moveable with respect to the other so as to be positioned below the other; and,
(b) draining electrolyte solution from the electrolyzer to the fluid reservoir by moving the position of at least one of the electrolyzer and the fluid reservoir so that the fluid reservoir is below the electrolyzer.

In one embodiment, the electrolyzer has a fluid flow port, the fluid reservoir has a fluid flow port and the fluid flow path includes the electrolyzer fluid flow port, the fluid reservoir fluid flow port and a valve and the method further comprises opening the valve.

In another embodiment, the electrolyzer and the liquid reservoir and connected together in an assembly and the method further comprises rotating the assembly about a generally horizontal axis.

In another embodiment, the electrolyzer and the liquid reservoir and connected together in an assembly and the assembly has a middle portion and the method further comprises rotating the assembly about an axis passing through the middle portion.

In another embodiment, the apparatus further comprises a plug which is removably receivable in a domestic electric outlet and the method further comprises inserting the plug into the domestic electric outlet prior to actuating the electrolyzer.

In another embodiment, the method further comprises draining electrolyte solution from the electrolyzer to the fluid reservoir and permitting the electrolyte solution to freeze in the fluid reservoir.

In another embodiment, the apparatus further comprises a heating member thermally connected to the fluid reservoir and the method further comprises using the heating member to liquefy electrolyte solution that has frozen in the fluid reservoir.

In another embodiment, the method further comprises draining the liquefied electrolyte solution from the fluid reservoir to the electrolyzer.

In accordance with another aspect of the instant invention, there is provided a method comprising:
(a) providing an apparatus comprising an electrolyzer, a fluid reservoir and a first fluid flow path extending between the electrolyzer and the fluid reservoir, at least one of the electrolyzer and the liquid reservoir is moveable with respect to the other so as to be positioned below the other; and,
(b) draining electrolyte solution from the electrolyzer to the fluid reservoir prior to exposing the apparatus to a temperature at which the electrolyte solution freezes.

In one embodiment, the apparatus further comprises a plug which is removably receivable in a domestic electric outlet and the method further comprises inserting the plug into the domestic electric outlet prior to actuating the electrolyzer.

In another embodiment, the apparatus further comprises a heating member thermally connected to the fluid reservoir and the method further comprises using the heating member to liquefy electrolyte solution that has frozen in the fluid reservoir.

In another embodiment, the method further comprises draining the liquefied electrolyte solution from the fluid reservoir to the electrolyzer.

In accordance with another aspect of the instant invention, there is provided a domestic apparatus comprising:
(a) an electrolyzer;
(b) an inlet port for providing liquid to the electrolyzer; and,
(c) a burner for gas produced by the electrolyzer.

In one embodiment, the inlet port is positioned to be accessible when the electrolyzer is positioned in the domestic apparatus.

In another embodiment, the domestic apparatus has an outer casing and the inlet port is positioned on the outer casing.

In another embodiment, the domestic apparatus has an outer surface and the inlet port is positioned to be accessible from the outer surface.

In another embodiment, the inlet port has a removable cap and the domestic apparatus has a liquid level indicator.

In another embodiment, the inlet port has a removable cap and a liquid level warning member whereby a person may refill the appliance when the liquid level warning member signals that the liquid in the electrolyzer has dropped below a predetermined level.

In accordance with another aspect of the instant invention, there is provided an apparatus comprising:
  (a) at least one of an electrolyzer which produces a combustible fuel and a hydrogen storage media;
  (b) a burner;
  (c) a first flow path extending between at least one of the electrolyzer and the hydrogen storage media and the burner;
  (d) a fan in fluid flow communication with a source of dilution air and the burner whereby the fan directs dilution air to the burner.

In one embodiment, the apparatus further comprises a second flow path extending between the fan and the burner.

In another embodiment, the second flow path is in fluid flow communication with the first flow path.

In another embodiment, the apparatus is portable.

In another embodiment, the apparatus further comprises a plug which is removably receivable in a domestic electric outlet.

In another embodiment, the apparatus is a domestic appliance

In another embodiment, the apparatus is a cooking appliance.

In accordance with another aspect of the instant invention, there is provided a method to inhibit flashback in an apparatus having at least one of an electrolyzer and a hydrogen storage media, the method comprising:
  (a) using the at least one of the electrolyzer and the hydrogen storage media to produce a combustible gas;
  (b) providing combustible gas to a burner; and,
  (c) providing sufficient dilution gas under pressure to the burner to prevent flashback.

In one embodiment, the method further comprises mixing the dilution gas and the combustible gas upstream of the burner.

In another embodiment, the method further comprises storing combustible gas produced by the electrolyzer in a storage member.

In another embodiment, the method further comprises subsequently conveying combustible gas from the storage member to the burner.

In another embodiment, the method further comprises using the combustible gas to cook food.

In another embodiment, the apparatus has a plug which is receivable in a domestic electric outlet and the method further comprises inserting the plug in the domestic electric outlet prior to actuating the electrolyzer.

In another embodiment, the method further comprises adjusting the amount of dilution gas that is provided to the burner based on the amount of combustible gas produced by the electrolyzer.

BRIEF DESCRIPTION OF THE DRAWINGS

For a better understanding of the present invention and to show more clearly how it may be carried into effect, reference will now be made by way of example to the accompanying drawings, of the preferred embodiments of the present invention, in which:

FIGS. 15a-15c are schematic drawings of a method and apparatus to drain an electrolyzer;

FIGS. 16a-16c are schematic drawings of an alternate method and apparatus to drain an electrolyzer;

DETAILED DESCRIPTION OF THE INVENTION

Figure 1:
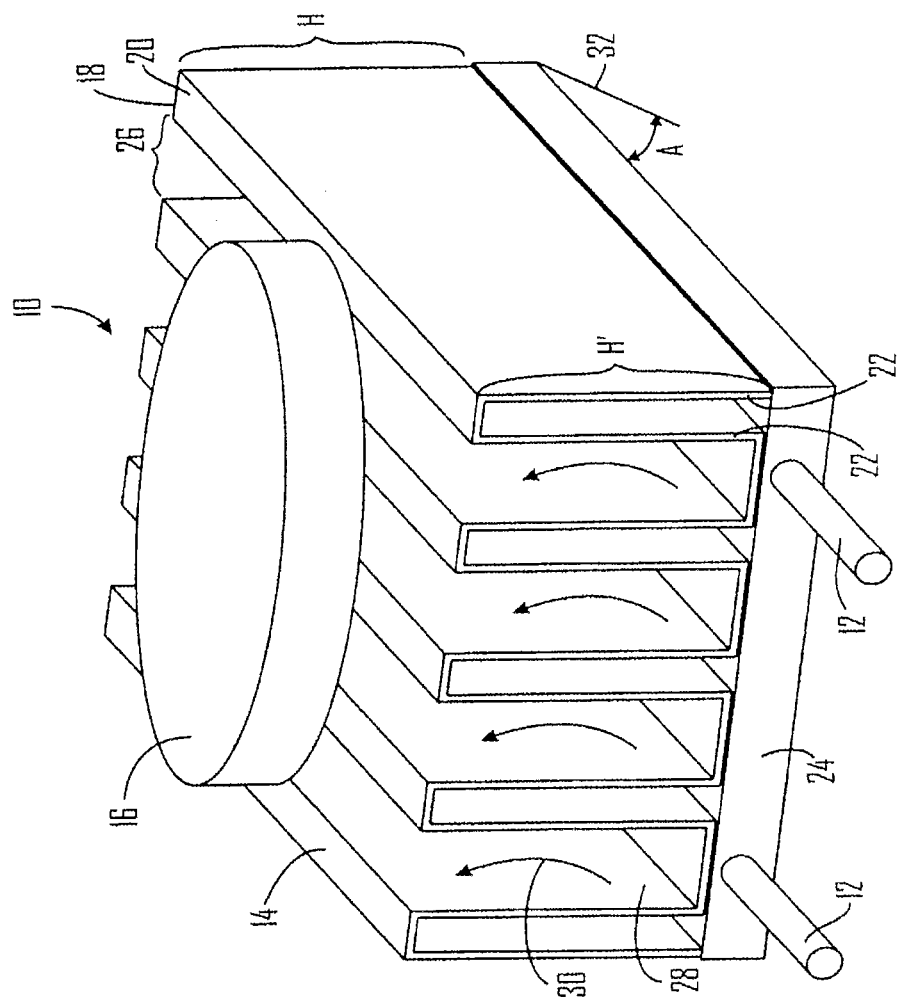
FIG. 1 is a perspective view of a preferred embodiment of the instant invention employing grooves and an electric heating element.

In accordance with the instant invention, an apparatus includes an electrolyzer. The electrolyzer is used to produce a combustible gas. For example, if the electrolyte solution used in the electrolyzer is aqueous, then the electrolyzer will produce hydrogen gas and oxygen gas. The electrolyzer may be configured to produce separate hydrogen gas and oxygen gas streams (e.g., the electrolyzer may have one or more oxygen outlet ports and one or more hydrogen outlet ports), or the electrolyzer may be configured to produce a mixed hydrogen gas and oxygen gas stream as is known in the art. Preferably, the combustible gas is hydrogen. The hydrogen is combusted to produce heat. The heat may be used to produce power, such as by being the heat source for a Stirling engine, or to cook food.

The apparatus is preferably a domestic apparatus (i.e., an apparatus which is designed to be used in a domestic location such as a house, an apartment or a cottage) and, more preferably, a cooking appliance. Examples of domestic apparatus include a garden tool (such as a weed trimmer, a lawn mower and the like), a pressure washer, a charger, a car jack, a fireplace, a power tool (such as a drill, circular saw and the like) a steam cleaner, a jackhammer, a high temperature means of dehydrating weeds so as to kill them. Examples of cooking appliances include an indoor grill, an outdoor grill, sandwich maker, a rotisserie, a microwave oven, a conventional oven, a flame wok, a flame tap pan yaki, a food steamer, a smoker wherein the hydrogen flame vaporizes, burns or chemically alters an aromatic material which imparts flavor and/or odor (aroma) to food wherein hydrogen is used for cooking. Cooking appliances such as an indoor grill, an outdoor grill, sandwich maker, a microwave oven and a conventional oven have a cooking surface. The cooking surface is a surface on which food is placed to be cooked (i.e., a food receiving surface), or a support surface on which a container in which food is placed for cooking (e.g., a pot, a wok) is placed. In a particularly preferred embodiment, the cooking surface is a food receiving surface, such as may be used in an indoor grill, an outdoor grill and a sandwich maker. Alternately, the cooking appliance may have a food support (e.g., a rod of a rotisserie). The food support supports the food in a cooking region.

The combustion of hydrogen in air, or a mixed hydrogen and oxygen stream, produces water vapor. Accordingly, an appliance that combusts hydrogen may be used indoors without venting the combustion products to the exterior (such as an exhaust fan that is used with natural gas or propane heated cook top surfaces) or with reduced venting requirements. Therefore, a cooking apparatus that uses hydrogen permits food to be cooked with a flame in an indoor environment. Accordingly, the use of an electrolyzer permits a consumer to simulate barbeque cooking indoors. Accordingly, a consumer may barbeque food indoors when it is raining, or if they do not have any outdoor space available (e.g. an apartment or condominium without a balcony or with a balcony but with restrictions on barbequing).

This specification sets forth several features that may be included in an apparatus that uses an electrolyzer. An apparatus may use one or more of these features. Accordingly, each feature is an alternate preferred embodiment. It will be appreciated that one or more of the features may be used in a single apparatus and accordingly various combinations and sub combinations of features may be incorporated into a single apparatus. The following portion of the specification exemplifies the features as used in a cooking appliance, preferably a domestic cooking appliance, and most preferably a portable domestic cooking appliance.

In accordance with one aspect of the instant invention, a food receiving surface that is configured to permit natural convective currents to form is provided. It will be appreciated that the construction of the food receiving surface may be used in any cooking appliance. Heat is provided to cook or reheat food placed on the food receiving surface. The source of heat may be electricity and/or a flame. However, it is preferred that the configuration of a food receiving surface is utilized in an appliance that uses a flame, alone or in combination with electrical heating. More preferably, the flame is produced by the combustion of hydrogen produced by an electrolyzer. In another embodiment, the hydrogen combustion is used to heat a ceramic, metal or glass which radiates energy at a desired frequency to cook food or to enhance the cooking of food and may optionally be used in conjunction with one or more of hydrogen flames, propane flames, propane infra red heating, electric contact heating, electric infra red heating, microwave cooking, ohmic cooking, steaming, or smoking, FIG. 1 exemplifies a preferred embodiment wherein the heat source is electrical resistance heating wherein the heat is conveyed by conduction to a food receiving surface (i.e., electrical contact heating) that is configured to produce convection to cook or heat food. In this embodiment, cooking appliance 10 comprises an electrical heating element 12 and a cooking surface 14, which is a food receiving surface as food may be cooked thereon. Electrical heating element 12 may be any electric heating element known in the art. Such elements typically comprise an electric resistance-heating member (i.e., an element that is heated by the flow of electricity therethrough) and may be a calrod element or a quartz element. Cooking surface 14 is heated by electrical heating element 12. Cooking surface is configured so as to permit convective airflow below food 16 that is placed on cooking surface 14 and to permit the convective airflow to directly contact food 16. Accordingly, cooking surface 14 comprises a discontinuous surface.

In the embodiment of FIG. 1, cooking surface comprises a plurality of ribs 18 that are laterally spaced apart so as to have top surfaces 20 and sidewalls 22. Top surfaces 20 are in thermal communication with sidewalls 22 and sidewalls 22 are in thermal communication with electric heating element 12. Accordingly, heat may be conveyed by conduction to top surface 20. Electric heating element 12 may be in thermal communication with base 24. For example, base 24 may incorporate, either by mechanical attachment or as a cast in element, electric heating element 12. Ribs 18 may be removably mounted on base 24. For example, ribs 18 may merely rest on the upper surface of base 24. Therefore, ribs 18 may be removed so that ribs 18 may be cleaned or used to serve food cooked thereon. It will be appreciated that the upper surface of base 24 may function as a drip tray and that base 24 may be removably mounted to a cooking appliance. Alternately, ribs 18 may be affixed to base 24. Therefore, ribs 18 and base 24 may be removably mounted to a cooking appliance. In either case, top surfaces 20 may be heated to a desired cooking temperature and therefore, may function as contact grilling elements. In use, food cooked on top surfaces 20 may have grill marks thereon if top surfaces 20 are heated sufficiently. It will be appreciated, that in an alternate embodiment, top surfaces 20 may have electric heating elements associated therewith or may in fact comprise electric heating elements. Accordingly, a base 24 need not be required. A drip tray or the like may be provided underneath ribs 18.

If top surfaces 20 are heated by an electric heating element positioned below the surfaces as shown in FIG. 1, then sidewalls 22 may be hollow or solid provided that they function as heat transfer members. Accordingly, ribs 18 may be constructed as heat exchange members that are in thermal communication with electric heating element 12. Ribs 18 may be affixed to or integrally cast with the base 24. Ribs 18 are constructed from a thermally conductive material such as aluminum, copper, cast iron or steel.

Top surfaces 20 are separated by a gap 26 so as to define an open space 28 below top surface 20. The rear of sidewalls 20 have a height H and the front of sidewalls 22 have a height H'. Heights H and H' may be the same or different. In accordance with the embodiment of FIG. 1, height H, H' and gap 26 between adjacent top surfaces 20 are dimensioned to permit convection currents 30 to be established below food 16 to assist top surfaces 20 to cook food. The height H, H' of sidewalls 22 maybe more than 0.75 inches, preferably 0.75 to 3 inches, more preferably 1.0 inches to 2.0 inches, and most preferably 1.25-1.5 inches and the gap 26 between top surfaces 20 maybe greater than 0.125 inches, preferably between 0.125 to 2 inches, more preferably 0.5 to 1.5 inches, and most preferably 0.75 to 1.0 inches in order to create the convection air currents 30 under the food 16 being cooked.

It will be appreciated that as heat is applied to cooking surface 14, natural convection currents will be induced in open spaces 28. Accordingly, food 16 will be cooked by both conduction (contact heating from top surfaces 20) and convection. Preferably, the convective currents 30 have a rise rate of 1 to 100 inches per second, more preferably 3-50 inches per second and most preferably 5-20 inches per second. Height H, H' and gap 26 may be selected to produce such rise rates. The convection currents are established below the central portion of the food 16 being cooked, and not just at the edges. The grooves of current contact cooking appliances do not create convection currents suitable for cooking food. Further, the grooves often trap moisture dripping from the food, which tends to boil the food rather than simulating a flame grilling experience.

It will be appreciated that as food 16 is cooked, fat may drip and collect on base 24. Therefore, base 24 may function as a drip tray. In such a case, base 24 is preferably inclined so as to cause the fat that lands on base 24 to flow to a collection area for disposal. Accordingly, the upper surface of base 24 is preferably solid. In an alternate construction, base 24 may be configured to permit fat to pass below base 24 where it is collected. Base 24 may be inclined by an angle A relative to the horizontal plane 32 of 0 to 20 degrees, preferably 2 to 12 degrees, and more preferably 5 to 8 degrees.

In an alternate construction, base 24 may be horizontal and the heights H, H' may be varied to create an angle of 0 to 20 degrees, preferably 2 to 12 degrees, and more preferably 5 to 8 degrees relative to the horizontal.

It is understood that ribs 18 could be applied to only the top surface of food 16 or to both the top and bottom surfaces of the food 16 to enhance the rate of cooking, e.g., by providing heat to both the upper and lower surfaces of food that is to be cooked or heated. Therefore, a food receiving surface may be positioned below and/or above food to be cooked in the cooking appliance.

Figure 2:
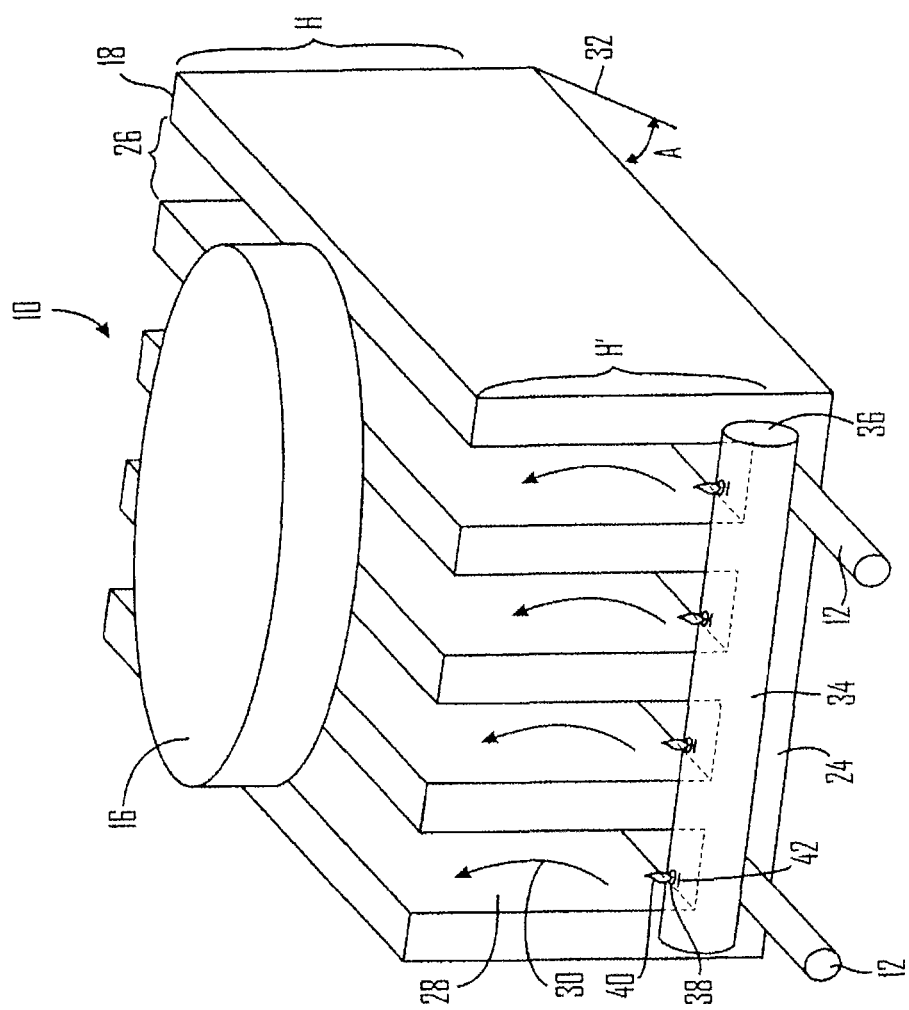
FIG. 2 is a perspective view of an alternative preferred embodiment of the instant invention employing grooves, an electric heating element, and a flame.

In accordance with another aspect of the instant invention, a cooking surface that is dimensioned to produce natural convective currents is provided and the food is cooked by combustion of a fuel and/or electrical heating. For example, the cooking appliance 10 of the alternate preferred embodiment of FIG. 2 combines electrical contact heating and cooking using a combustible fuel. Accordingly, a burner is provided that may be the sole source of heat, may be used alternately with electric heating element 12, and, preferably, is used simultaneously therewith. It will be appreciated that one or more burners may be positioned so as to provide heat to only a portion of cooking surface 14 (e.g., the portion which is not heated by the burner will be cooler and may be used to cook food slower or to keep food that has been cooked warm until it is to be served) or under all of cooking surface 14. Burner 34 may be positioned in some or all open spaces 28 and may be positioned adjacent base 24. Preferably, the burner is recessed sufficiently such that a user may not insert a finger to touch the burner and, more preferably, a user may not insert a finger to a position that would be the tip of a flame. Preferably, the burners are positioned underneath the solid portion of the grill surface or cooking surface, or baffles thereunder, to prevent a person from touching the flame.

The burner may be any burner known in the art. In accordance with another aspect of this invention, as exemplified in FIG. 2, burner 34 comprises one or more manifolds 36 which incorporate a series of ports 38 through which a combustible fuel (gas, liquid or solid) is delivered to create flames 40 which will provide heat, or additional heat, to cook the food and to enhance convective air currents 30. The flames 40 can be used to cook the food 16, or the electric heating element 12 can be used to cook the food 16, or a combination thereof can be used to cook the food 16.

The diameter of the ports 38 may be 0.001 to 0.035 inches, preferably 0.003 to 0.025 inches, more preferably 0.005 to 0.012 and most preferably between 0.007 and 0.010 inches. The wall thickness of manifold 36 is preferably 0.02 to 0.100 inches, more preferably 0.005 to 0.035 inches, and most preferably 0.010 to 0.020 inches. The interior diameter of manifold 36 and the tubing, which connects manifold 36 to an electrolyzer, is preferably 0.020 to 0.5 inches, more preferably 0.025 to 0.250 inches, and most preferably 0.050 to 0.125 inches. The ports 38 are preferably produced by cutting with a laser beam or by drilling at very high speeds. Manifold 36 may be made of aluminum, steel, brass, copper, stainless steel, nickel or any other high temperature metal, glass, plastic, or composite. The spacing between the orifices or ports 38 may be 0.125 to 2 inches, preferably 0.5 to 2 inches, and more preferably 1.0 to 1.5 inches. The axis defined by the flow of gas through the orifices 38 may be between −10 degrees and plus 30 degrees (upwards) relative to the surface 14.

Figure 14:
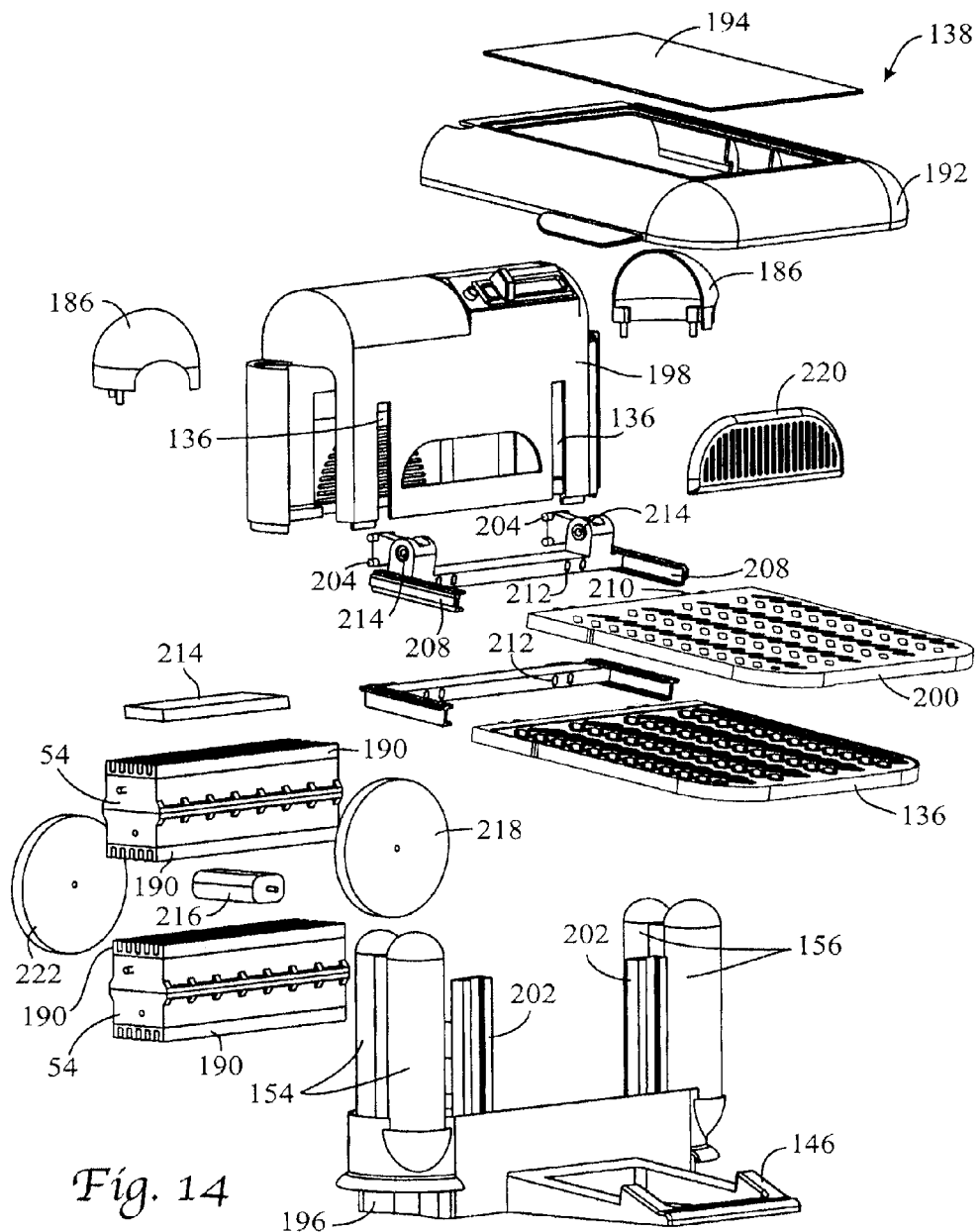
FIG. 14 is an exploded view of an alternate embodiment of FIG. 7.

The cooking surface may comprise a food receiving surface (e.g. ribs 18) and an electrical heating member (e.g. electric heating element 12 in base 24). The food receiving surface and the electrical heating member may be a unitary construction (i.e. they may be assembled as a unit). Preferably, the food receiving surface and the electrical heating member are removably mounted to the cooking appliance such that both the food receiving surface and the electrical heating member are removed from the cooking appliance at the same time (as a single element). For example, an electric heating element 12 may be integrated into the food receiving surface. As shown in FIG. 14, each cooking surface 136 and 200 is slidable receivable in brackets 208. Each cooking surfaces 136 and 200 has electrical contacts 210 on the rear thereof. Mating contacts 212 are provided in the bracket 208. Accordingly, when cooking surface 136, 200 is slide into position in bracket 208, the electric heating element is electrically connected to the appliance. It will be appreciated that mating contacts 212 may be connected to a source of current by any means known in the art, e,g., they may be hard wired to the electronic control package 214. Contacts 210, 212 may be any such electrical connectors known in the art.

Alternately, the food receiving surface may be removably received on the electrical heating member (e.g., being seated on base 24 or removably secured to base 24). It will be appreciated that the food receiving surface may be removably mounted to electric heating element 12 and that electric heating element 12 need not be mounted in a base.

In accordance with another aspect of the instant invention, orifices 38 are preferably placed such that the drippings from the food 16 cooking will not drip onto them thereby preventing foreign materials from contaminating, clogging or damaging the ports 38 through which the combustible gas flows. Preferably, the cooking surface has openings provided therein and the cooking surface is positioned above the burner and configured to direct liquid produced when food is cooked away from the burner ports 38. The openings permit the combustion products to rise up and directly contact food that is on the cooking surface. The cooking surface may be angled downwardly towards these openings. For example, the cooking surface may be generally corrugated with the openings provided in the troughs of the corrugations. Preferably, the corrugations are generally V shaped.

In accordance with another aspect of this invention, the combustion products may be utilized to heat the ribs 18. For example, if sidewalls 22 are hollow and have an open bottom, then the ports 38 may be positioned beneath top surfaces 20 and below sidewalls 22 such that the combustion products rise up to heat the lower side of top surfaces 20. It will be appreciated that ports 38 may be positioned between sidewalls 22 and, accordingly, the flame is located within ribs 18. In a further alternate embodiment, the combustion products may be conveyed through a passage to the hollow space internal of ribs 18. In such a case, ports 38 need not be positioned below cooking surface 14 provided the combustion products are conveyed to flow through the ribs.

The combustible gas may be ignited by any means known in the arts. For example, a user may manually light burner 34 when fuel is supplied to ports 38. For example, a user may place a lit match adjacent the fuel inlet source. Preferably, an ignition member 42 is provided. The ignition member may be any ignition member known in the art. Manually ignition members (e.g. spark generators that are powered electrically) are known in the barbeque and cook top arts. Accordingly, ignition member 42 may be positioned adjacent to and below one or more of the ports 38 of the manifold 36 to provide a means of igniting the combustible fuel. Preferably the ignition member 42 is positioned sufficiently close to the ports 38 to ignite the combustible fuel delivered by the manifold 36 yet remain sufficiently distant that it is not damaged by the flames 40 during cooking. The ignition member 42 may be an electrically heated wire made of nichrome or another suitable material that can sustain high temperature operation. Alternatively, the ignition member 42 may be a wire to which high voltage is applied and which is mounted such that sparks will occur periodically between the grounded manifold 36 and the ignition member 42 in areas sufficiently proximal to the ports 38 so as to ignite the combustible fuel. The ignition member 42 may be a hot wire ignition member that is placed 0.050" to 0.125" away from the ports 38.

The ignition member may either be activated by the user when the cooking appliance is first turned on or, preferably, it may remain active during the entire cooking process to ensure that if the flame 40 were extinguished by accident, such as fluid from the food dripping onto the flame, the flame would quickly be re-lit.

The combustible fuel may be a fuel that is currently used for cooking or heating such as methane (natural gas), propane, butane, naphtha, or methylated spirits. Preferably, hydrogen gas may be used as the combustible fuel. An advantage of the use of hydrogen is that the product gasses of combustion need not be vented. Preferably, the hydrogen is produced by the electrolysis of water.

In accordance with another aspect of the instant invention, the apparatus includes a hydrogen storage member other than a pressurized canister. The hydrogen gas may be stored in a hydrogen storage media, such as a metal hydride, carbon nano-tubes, a hydrogen salt, a metal salt, or in a plastic, ceramic, or glass adsorbtive material, or a combination of these various materials and used as required, e.g., for cooking. Many such methods art known in the art and any such method may be used herein. Some hydrogen storage media, such as magnesium hydrides, micro-porous oxides, metal nitrides or zeolites or a combination thereof absorb hydrogen at ambient temperatures and moderate top high pressures but only release hydrogen at elevated temperatures or when an electric current is passed through the material. Therefore, such storage media provide a safe method for storing hydrogen as there is no concern that a pressurized storage container will leak.

An apparatus which uses such a storage media preferably has a heat source to heat the hydrogen storage media. For example, the hydrogen storage media may have an electrical resistance heating element in thermal contact therewith. When hydrogen is required, current may be provided to the electrical resistance heating element so as to release hydrogen. Preferably, the amount of current that is applied is variable (e.g., a variable rheostat). Accordingly, as more current is applied, more hydrogen is released. Therefore, the settings on, e.g., a variable rheostat, may be labeled as low heat, medium heat and high heat or the like. The current for the electrical resistance heating element may be provided from a domestic electric outlet (e.g., the apparatus may be plugged in). Accordingly, in operation, the apparatus may be connected to a domestic electric outlet. When hydrogen is required, current may be provided to the electrical resistance heating element at a desired rate to produce a desired flow of hydrogen.

Alternately, if it is intended to operate the apparatus at a location when no electric supply is available, a battery or other current storage member may be provided. The current storage member may be used to provide current to heat the electrical resistance heating element to cause the hydrogen storage media to release hydrogen at the location where the apparatus is to be used. For example, if the apparatus is a cooking appliance, the appliance may be plugged in and charged indoors at a residence. The hydrogen storage media may then also be charged. The appliance may then be taken, e.g., on a picnic where no electrical supply is available such as in a park, and the appliance used to cook food using stored hydrogen and current.

In an alternate embodiment, the hydrogen storage media may be removably receivable in an apparatus. Alternately, or in addition, the apparatus may be adapted to receive one or more hydrogen storage media. Accordingly an apparatus may be provided with hydrogen from two or more hydrogen storage media. The hydrogen storage media may be used sequentially (to expand the operating time of the apparatus) or concurrently (to expand the amount of hydrogen available to the apparatus).

In a further alternate embodiment, the apparatus may comprise, or be, a charger. The charger has a member (e.g. an electrolyzer) that provides hydrogen that is stored in the hydrogen storage media. One or more hydrogen storage members is placed in the charger and, e.g. one or more electrolyzers operated to provide hydrogen that is stored. The hydrogen storage member or members may then be removed and placed in a second apparatus to provide hydrogen to the second apparatus. For example, the apparatus may be a cooking appliance and the hydrogen storage media may provide hydrogen for cooking. Alternately, the apparatus may be a domestic apparatus such as a garden tool, a power tool, a pressure washer and a car jack. The hydrogen storage media may be designed to be interchangeably received in two or more different domestic apparatus. Accordingly, the hydrogen storage media may be of a common size that is receivable in different domestic apparatus and similar to, e.g., an AA or C battery. One advantage of this design is that the hydrogen storage media permits electricity to be stored as hydrogen and subsequently used by combusting the hydrogen to provide heat for cooking or power.

Accordingly, the hydrogen storage media may be refilled or replaced with a full storage member as required. Alternatively, or in addition, the hydrogen gas that is stored in the hydrogen storage media may be created by electrolysis or by a chemical reaction in an apparatus.

In a further alternate embodiment, some or all of the hydrogen gas that is produced may be consumed as it is used and the remainder may be stored. Alternately, some or all of the hydrogen gas that is produced may be stored as it is produced and the remainder may be consumed. For example, the hydrogen gas could be produced by electrolysis or by another chemical or electrochemical reaction and stored either in a bottle under pressure or in a metal hydride from which the hydrogen is subsequently withdrawn when it is required for cooking. Thus, for instance, cooking appliance 10 employing hydrogen gas as the combustible fuel could create hydrogen, e.g. by the electrolysis of an aqueous electrolyte solution such as potassium hydroxide when electricity costs are low or when renewable energy from wind or solar power is available, and store the hydrogen produced until the hydrogen is needed for cooking. Subsequently, the stored hydrogen could be used. Alternately, some or all of the hydrogen gas could be used for cooking concurrently while hydrogen gas is produced.

For example, if cooking appliance 10 includes an electrolyzer, then some or all of the oxygen produced by the electrolysis may be used to combust the hydrogen. The hydrogen and oxygen may be collected from the headspace of the electrolyzer and conveyed through the same passage to manifold 36. Alternately, the hydrogen and oxygen may be separately collected from the electrolyzer and provided to ports 38 via separate passages. Accordingly, the hydrogen and oxygen may be mixed at ports 38. It is also possible to provide only hydrogen gas to the ports 38 and to burn the hydrogen with atmospheric oxygen.

An advantage of an alternate embodiment that uses a hydrogen storage media is that the hydrogen produced can be withdrawn from the hydrogen storage media and burned at a rate that is greater than the rate of energy delivery to the electrolyzer to create the hydrogen gas originally. For example, an appliance that is plugged into a standard North American household electrical outlet may draw 1500 W of energy. This electricity could be used (e.g. for 1 hour) to produce hydrogen that is stored. When cooking appliance 10 is utilized, the stored hydrogen could be combusted at the same time as electricity drawn from the household outlet is utilized to provide electric heating and additional hydrogen. Accordingly, cooking appliance 10 could deliver the hydrogen produced at a rate of 3,000 W for a period of time thus accelerating the rate at which food can be cooked. It will be appreciated that several cooking modes could be utilized including (1) combustion of the stored hydrogen and using the electricity drawn during cooking to power electric heating, (2) combustion of the stored hydrogen and using the electricity drawn during cooking to power electric heating and to produce additional hydrogen, (3) using the electricity drawn during cooking to power electric heating and to produce additional hydrogen and to not utilize the stored hydrogen and (4) unplugging the cooking appliance and using only the stored hydrogen for cooking (electrical heating and/or combustion of hydrogen, wherein the hydrogen was previously produced and stored). Accordingly, the cooking appliance could be recharged inside a house and used outside, such as on a patio or balcony (if there is no convenient electrical outlet outside, or used at a remote picnic site).

It will be appreciated that the use of stored energy in the form of hydrogen in an appliance, including a portable appliance, can also be used for other appliances. Such appliances can provide one or more of the following functions: space heating; water heating; electricity generation by hydrogen injection into a fuel cell; refrigeration or air conditioning through an adsorption cycle such as ammonia cycle refrigeration; electricity generation by hydrogen combustion within a thermopile or thermoelectric generator; electricity generation by hydrogen combustion with an turbine, internal combustion, external combustion, Stirling or Manson engine or other prime mover connected to a generator.

Alternatively, cooking appliance 10 may also be constructed which both creates hydrogen by any means such as hydrolysis and withdraws stored hydrogen to create the hydrogen flow rate to achieve the desired heat for cooking.

It will be appreciated that if a hydrogen storage media is provided, that the hydrogen storage media is downstream from the electrolyzer and upstream from a burner. If the burner can concurrently burn hydrogen from the hydrogen storage media and hydrogen from the electrolyzer, then the burner may be in fluid flow communication with both the hydrogen storage media, which is in turn in fluid flow communication with the electrolyzer, and the electrolyzer. Suitable valves may be provided to permit a consumer to select the desired source or sources of hydrogen.

Figure 3:
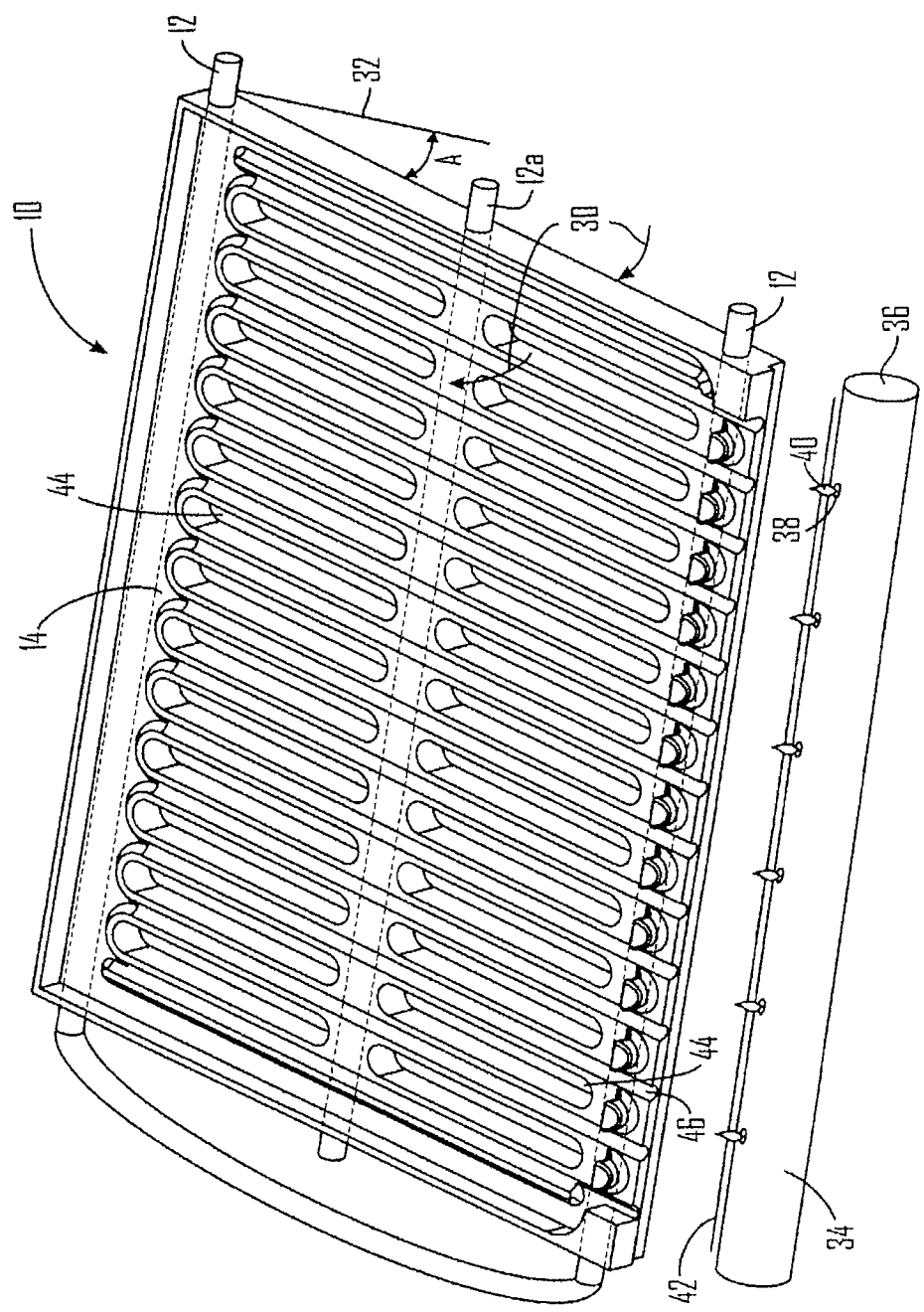
FIG. 3 is a perspective view of an alternative preferred embodiment of the instant invention employing grooves, slots, an electric heating element, and a flame.

FIG. 3 exemplifies an alternate embodiment of a cooking appliance 10 that employs several aspects of the invention. In particular, the cooking appliance employs both cooking electrical contact heating and cooking using a combustible fuel. In this embodiment, cooking appliance 10 is configured as a traditional grill. Accordingly, cooking surface 14 comprises a grill having a series of slots 44 and, in addition, preferably grooves 46 that facilitate the flow of fluid from the cooking process away from the food being cooked. Cooking surface 14 may be constructed from a thermally conductive material such as aluminum, copper, cast iron and steel. At least one, and preferably a plurality, of electrical heating elements 12 are incorporated into or onto cooking surface 14 so as to be in thermal communication with cooking surface 14. It will be appreciated that cooking surface 14 may alternately essentially consist of one or more electrical heating elements 12. It will also be appreciated that in an alternate embodiment, grooves 46 may be replaced by slots 44.

Utilizing a further aspect of the invention, slots 44, and preferably slots 44 and grooves 46, are dimensioned to permit convection currents 30 to be established below food to assist cooking surface 14 to cook food. Preferably, convective air currents 30 have a rise rate of 1 to 1000 inches per second, more preferably 3-100 inches per second and most preferably 5-50 inches per second. Slots 44 may be 0.25 to 3 inches wide and 0.25 to 24 inches long, preferably 0.375 to 1.0 inches wide and 1 to 6 inches long, and more preferably 0.5 to 0.75 inches wide and 2 to 4 inches long. Alternately, or in addition, grooves 46 may be 0.125 to 1.0 inches wide and 0.125 to 2 inches deep, preferably 0.25 to 0.75 inches wide and 0.25 to 0.75 inches deep, and more preferably 0.375 to 0.5 inches wide and 0.375 to 0.5 inches deep to facilitate the flow of fluid from the cooking process away from the food being cooked. Accordingly, slots 44 and the grooves 46 create a geometry that facilitates convection air currents 30 under the food being cooked.

It is understood that the grill plate of FIG. 3 could be applied to both sides of food to enhance the rate of cooking. Accordingly, a cooking appliance may have an upper cooking member and a lower cooking surface. In such an embodiment, the lower cooking surface is preferably a food receiving surface. Upper cooking member may be any cooking member known in the art (i.e., any member that provides heat to the upper surface of food in a cooking region) and, preferably, is any cooking surface disclosed herein and, more preferably, is a food receiving surface that is heated. The upper food receiving surface may be electrically heated and/or heated by combustion products (e.g. hot combustion gasses being passed through or over the upper food receiving surface). Preferably at least one, and more preferably both, of the upper and lower cooking surfaces is removably mounted to the cooking appliance.

As with the embodiment of FIG. 1, cooking surface 14 may be horizontal or inclined.

In accordance with a further aspect of this invention, the grill plate of FIG. 3 is also preferably provided with a burner 34. In such an embodiment, slots 44 may be of any particular configuration that permits flames 40 from the burner 34 to directly heat food on cooking surface 14. Alternately, slots 44 may be dimensioned to permit the formation of convective air currents 30 having the rise rate set out herein. It will be appreciated that ports 38 may be positioned below the solid portions of cooking surface 14, i.e., not under slots 44, thereby reducing the likelihood of fat and other liquids dripping onto ports 38.

In accordance with another alternate aspect of this invention, in operation, a user may plug the appliance into an electrical outlet. This step is not required if the unit is hard wired. When the apparatus is connected to an electrical source, or if the apparatus is being operated on a battery that powers the release of hydrogen from a hydrogen storage media, the user may then turn the apparatus on. Preferably, the user actuates a single control that commences the operation of the electrolyzer and the ignition member. When a sufficient amount of gas has been produced to produce a constant flame, a valve may open to permit the gas to be provided to a burner. The ignition member is operating thereby resulting in the gas automatically being ignited when it flows to the burner. Alternately, the circuit may include a timer, pressure sensor, flow sensor or the like that causes the ignition member to be actuated when gas starts flowing to the burner (e.g., in the case of a sparking ignition member). If the ignition member is a heated wire, then the timer, pressure sensor, flow sensor or the like may cause the ignition wire to commence heating sufficiently in advance of the gas flowing to the burner such that the ignition wire is at temperature when the gas reaches the burner. It will be appreciated that the single control may be a start button that is pushed and held down by a consumer until a flame is produced (e.g. a lamp light indicating that the button may be released or a light extinguished indicating that the button may be released). Alternately, the start button may merely be pressed and the circuit configured to maintain the operation of the electrolyzer and the ignition member during the start up sequence.

Figure 4:
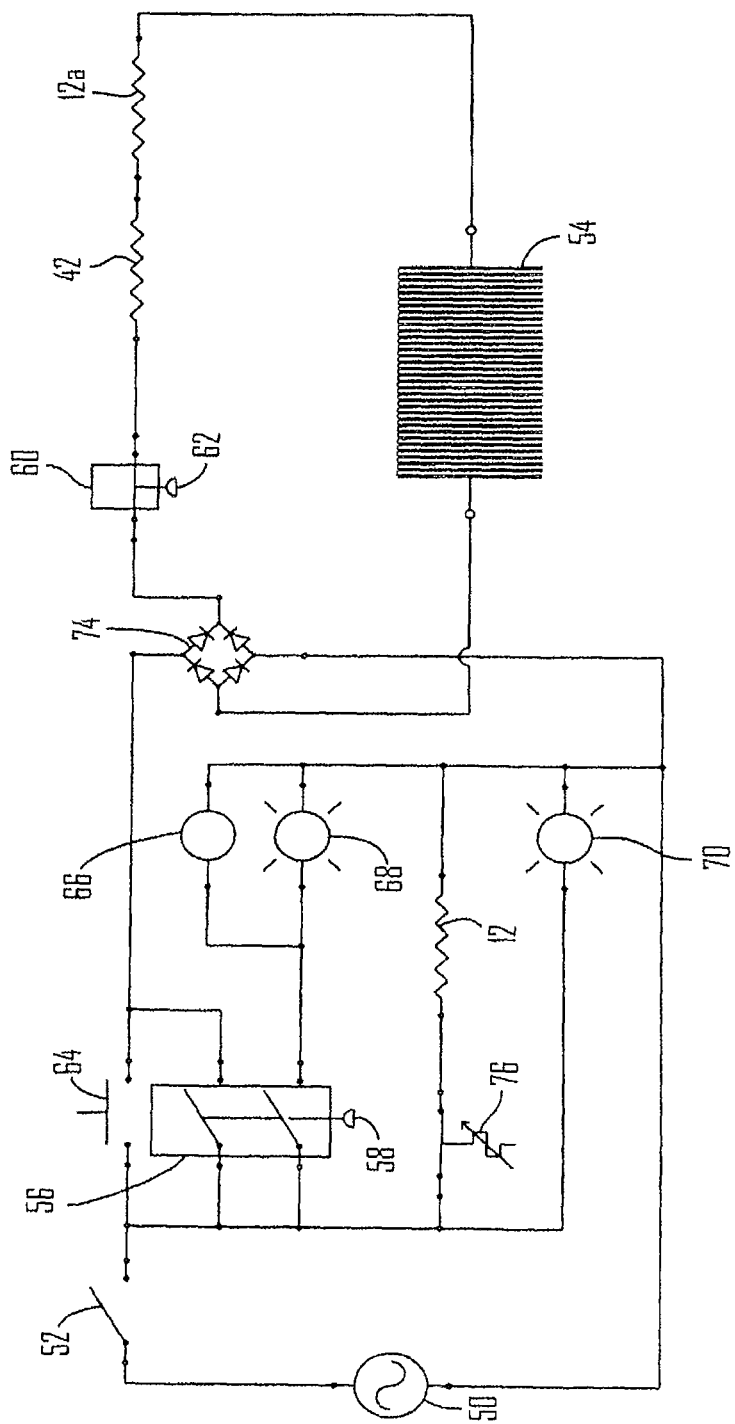
FIG. 4 is an electrical schematic of an alternative preferred embodiment of the instant invention.

For example, FIG. 4 shows an exemplary wiring diagram for the hydrogen flame-cooking appliance described in FIG. 3 components of which may be housed in electronic control package 214. Circuit 48 includes a source of electricity 50, an on/off switch 52, electrical heating element 12 and electrolyzer 54. Source 50 may be a household electrical outlet. In North America, this is typically a 120 VAC outlet and in Europe it may be a 240 VAC outlet. On/off switch 28, accordingly may be rated 120/240 VAC, 15 A and is preferably a single pole, single throw switch to turn all power to the unit on and off. A lamp 70 may be wired with on/off switch 52 to indicate when the switch is set to "on". In a preferred embodiment, the appliance is designed to operate on household current. Therefore, the appliance may be a portable countertop appliance. In such an embodiment, a user may place the appliance on a countertop and plug it in when it is desired, e.g., to cook. Alternately, the appliance could be stored on the counter top. The user may then plug the appliance in and then turn the unit on to, e.g., start cooking. It will be appreciate that the appliance could be hard wired.

Heating element 12, e.g. for a lower cooking surface, may be electrically wired through a manually adjustable temperature control 76, such as a variable spring for a bi-metallic element, to allow the user to vary the temperature of heating element 12. This can be accomplished with a mechanical lever or knob. One or more additional heating elements 12a, e.g. for an upper cooking surface, may be electrically connected in series with the electrolyzer 54 and optionally in series with the ignition member 42.

The cooking appliance may incorporate one or more safety features. These include pressure switch 56, pressure switch 60 and three way valve 66.

Figure 5:
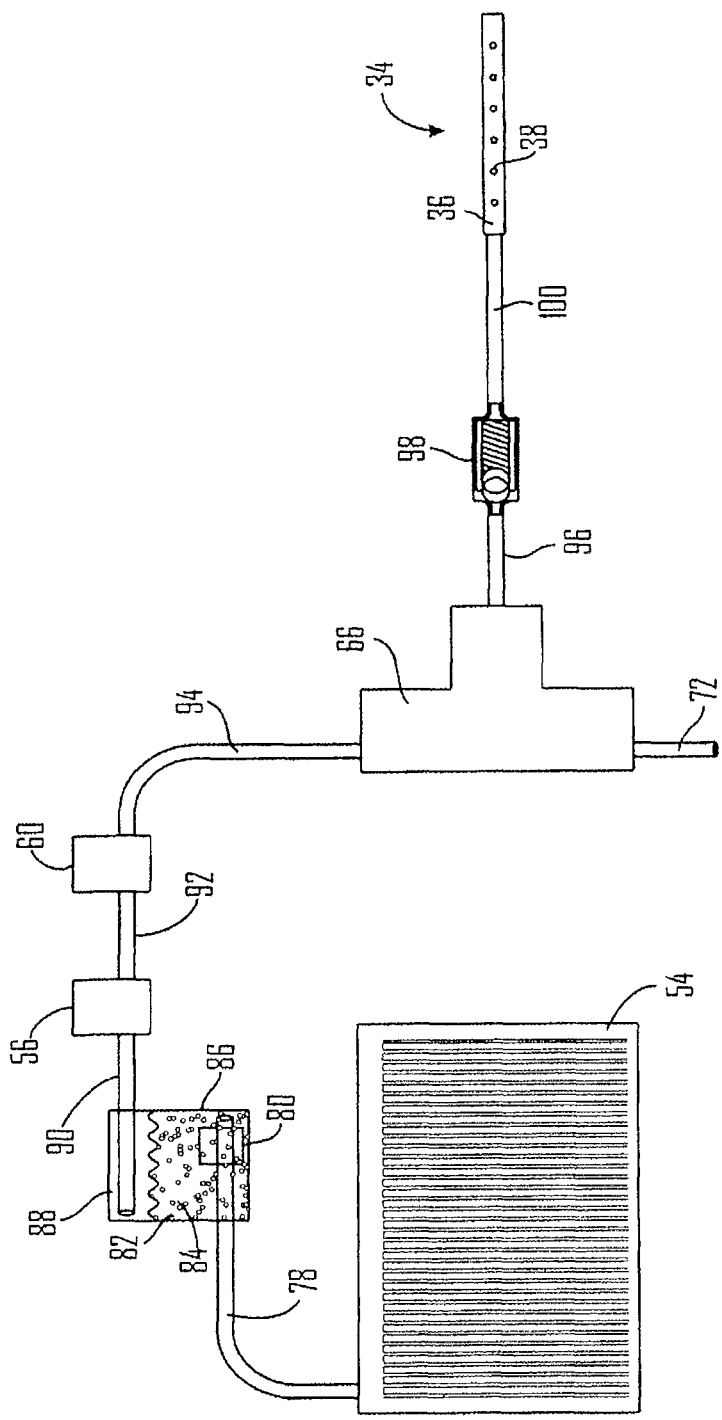
FIG. 5 is an fluidic schematic of the alternative preferred embodiment of the instant invention described in FIG. 4.

Preferably, as a safety feature, circuit 48 includes pressure switch 56. As shown in FIG. 5, gas produced in electrolyzer 54 travels to manifold 36 via pressure switch 56. Pressure switch 56 is configured to close at a predetermined pressure. The predetermined pressure may be the minimum pressure to achieve a gas flow rate at the ports 38 that prevents a flame traveling upstream past the ports 38. Preferably, the gas flow rate exceeds the flame propagation rate for the fuel being used (i.e. a rate sufficiently fast to prevent flashback). Preferably, the gas flow speed is 2-10× higher than the flame propagation rate of the hydrogen and oxygen gas mixture produced by electrolyzer 54, and more preferably 3-5× faster. Pressure switch 56 may be a double pole, single throw, switch that is normally open. Accordingly, pressure switch 56 may be set to prevent "flashback" into the electrolyzer 54 and to keep the flame away from the wall of the manifold 36 thereby keeping the manifold cool and maintaining the integrity of the ports 38. In typical applications, pressure switch 56 may be actuated, i.e., closed, when a pressure of 0.1 to 3.0 pounds per square inch (PSIG) of pressure is applied at inlet port 58, and more preferably between 0.5 and 1.5 pounds per square inch (PSIG), and most preferably between 0.75 and 1.0 pounds per square inch (PSIG). Typically, such pressures ensure that the flow velocity of the combustible gas within the burner 34 is maintained above a minimum flow to prevent flame propagation down the tube that can cause a "flashback".

Second pressure switch 60 is configured to open when a predetermined pressure is exceeded. Second pressure switch 60 may be a normally closed contact that opens when a predetermined maximum operating pressure for the electrolyzer 54 is reached based on its mechanical integrity. For many consumer applications, a pressure of 3 to 150 pounds per square inch (PSIG) is preferably the maximum allowable pressure, more preferably 4 to 50 pounds per square inch (PSIG), and most preferably 5 to 10 pounds per square inch (PSIG). Pressure switch 60 limits the maximum pressure developed by the cooking appliance 10 if a blockage occurs, e.g., in a manifold, a hydrogen storage media and/or a flow passage. If the pressure exceeds the maximum pressure set, circuit 48 opens and the power to electrolyzer 54 is interrupted which stops the production of gas. Pressure switch may include an outlet port 62. Port 62 may vent the gas to the ambient and/or to a hydrogen storage media. Accordingly, when the predetermined pressure is exceeded, outlet port 62 opens and the excess pressure is relieved. If the pressure decreases below the maximum pressure set (such as by the excess pressure being released through outlet port 62), outlet port 62 will close and the normally closed contacts of pressure switch 60 close and power is restored and gas production resumes. This also controls variations in production due to input voltage fluctuations.

If pressure switch 56 is provided, then a flame igniter switch 64 is also preferably provided. When closed, flame igniter switch 64 essentially bypasses the contacts of pressure switch 56 thereby allowing current to flow through the hot wire ignition member 42 and through the electrolyzer 54, which begins the production of gas while the three-way solenoid valve 66 remains mechanically closed. Flame igniter switch 64 may be a momentary contact switch rated at 120/240 VAC, 15 A, incorporating a single pole, single throw switch. The fluidic connections of the three-way valve 66 are shown in FIG. 5. Once the pressure within the electrolyzer reaches a pressure which represents the minimum pressure to achieve a gas flow rate at the ports 38 which exceeds, e.g., the flame propagation rate for the fuel being used, the contacts of pressure switch 56 close, an option signal is actuated (e.g., lamp 68 is lit) and the user can release the flame igniter switch 64. The lamp 68 may optionally be replaced with a resistor in series with a light emitting diode.

Lamp 68 is also preferred wired so that lamp 68 is on when three-way valve 66 is powered by means of the pressure switch 56. The three-way valve 66 is configured to connect manifold 36 in fluid flow communication with electrolyzer 54 when pressure switch 56 is closed and to connect manifold 36 in fluid flow communication with the atmosphere via passage 72 when pressure switch 56 is open. Accordingly, three way valve 66 may be a three way solenoid valve that is wired such that when current flows through pressure switch 56, valve 66 is opened and valve 66 permits hydrogen and/or hydrogen and oxygen gas to flow to manifold 36 from the electrolyzer 54. The three-way solenoid 66 is also preferably mechanically arranged such that it closes, e.g., in 1-20 milliseconds, more preferably 1-10 milliseconds, and most preferably between 1-4 milliseconds, when pressure switch 56 opens thereby diverting the gas from the manifold 36 to atmosphere via passage 72. When the three way solenoid valve is de-energized, the burner 34 is connected to atmosphere, the pressure and velocity of the hydrogen/oxygen gas mixture reduces, and the flame propagates into the burner, through the valve 66 and then to atmosphere thereby preventing a "flashback" into the electrolyzer 54.

The fluidic passages, seats and seals of the three way solenoid valve 66 are preferably made of stainless steel or another material that is not damaged by the gases produced by electrolysis or the combustion gases, e.g., Viton or other chemically inert seals.

Preferably, hot wire ignition member 42 is electrically connected in series with the electrolyzer 54. Thus, if the hot wire ignition member 42 is damaged, the flow of hydrogen/oxygen gas will stop, as no power will flow to electrolyzer 54. This is a simple built-in safety system. In addition, one or more electric cooking elements 12 may also be wired in series with electrolyzer 54 and igniter 42. Accordingly, if ignition member 42 is damaged, then no power will flow to the electric cooking elements. This will provide a signal to the user that the ignition member is damaged. Preferably heating element 12a is electrically connected in series with the hot wire ignition member 42 and the electrolyzer 54. The voltage drop across heating element 12a ensures that the voltage supplied to the hot wire ignition member 42 and electrolyzer 54 is within the required range for normal operation.

If power source 50 is an alternating current source, then an AC to DC converter, such as four diodes or bridge rectifier 74, is employed to convert the alternating input current into the direct current required by the electrolyzer 54.

Figure 12:
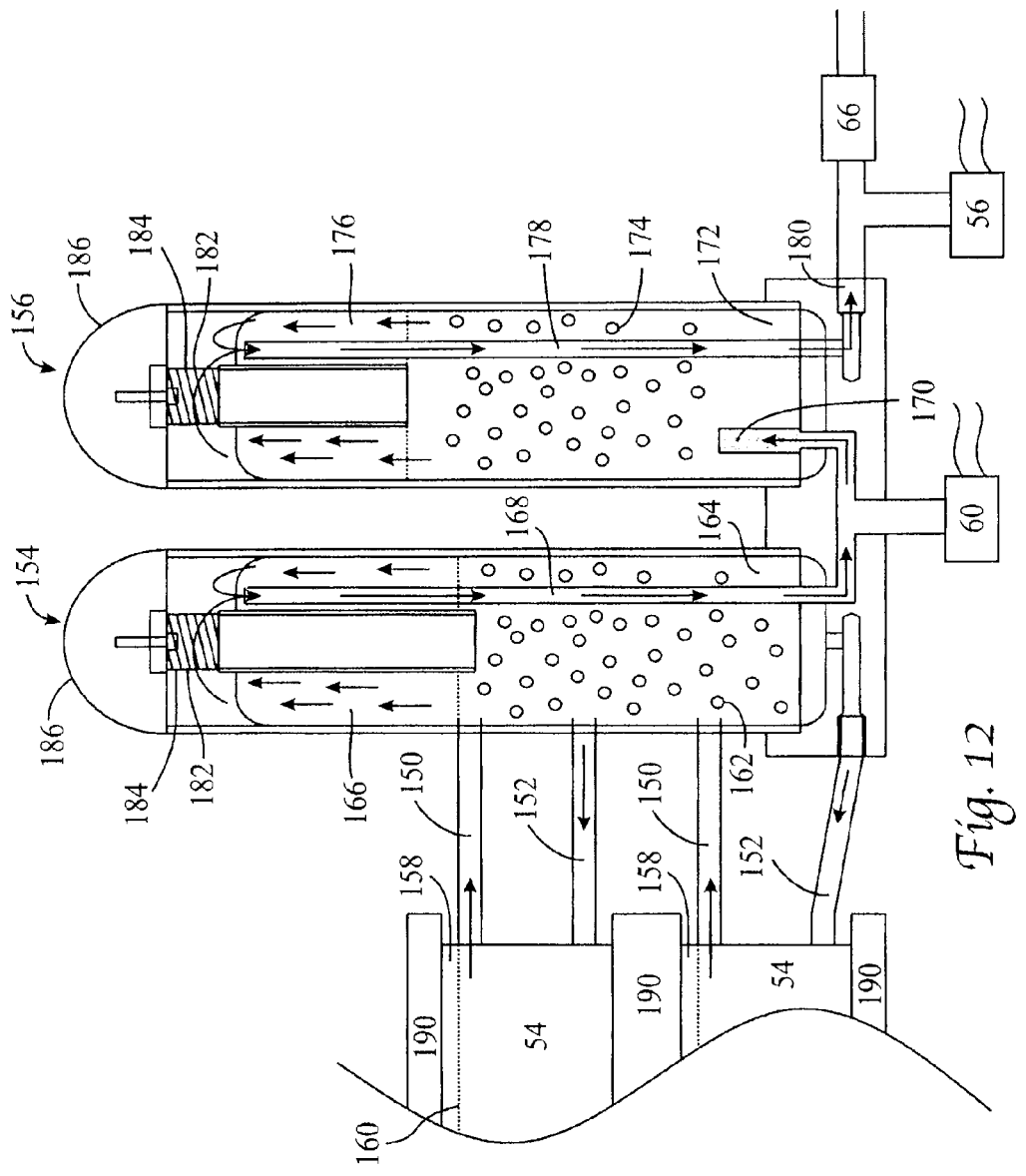
FIG. 12 is a schematic drawing of the components inside a main casing of the grill of FIG. 7.

In accordance with another aspect of the invention, the apparatus includes one or more spargers that are positioned in the fluid flow passage from the source of hydrogen (the electrolyzer and/or the hydrogen storage media) and the burner (see for example FIG. 12). One advantage of such a design is that the sparger prevents a flame from traveling backwards upstream of the sparger to the electrolyzer and/or the hydrogen storage media. In addition, the sparger humidifies the gas stream thereby providing additional water in the cooking region and assisting to prevent food from being dried out while cooking or heating food in the cooking region. If the apparatus does not have a hydrogen storage media, then one or more spargers may be positioned in the fluid flow path from the electrolyzer to the burner. If the apparatus has a hydrogen storage media and no electrolyzer (e.g., in the case of a charger), then one or more spargers may be positioned in the fluid flow path from the hydrogen storage media to the burner. If the apparatus has an electrolyzer and a hydrogen storage media and if the flow paths from the electrolyzer and the hydrogen storage media merge upstream of the burner, then one or more sparges may be positioned upstream of the burner and downstream from the position at which the flow paths merge or the flow paths may merge at the sparger (e.g., a flow path may be provided from the electrolyzer to the sparger and a flow path may be provided from the hydrogen storage media to the sparger). Alternately, separate flow paths may be provided from the electrolyzer to the burner and from the hydrogen storage media to the burner and each flow path may have one or more spargers therein.

For example, referring to FIG. 5, a preferred schematic diagram of the connection of electrolyzer 54 to burner 34 is shown. Accordingly, electrolyzer 54 produces a hydrogen and oxygen gas mixture that may pass through tube 78 into the sparger 80, which produces a series of bubbles 82 in the water 84 in the sparger chamber 86. The hydrogen and oxygen gas mixture then passes from the headspace 88 of the sparger chamber 86 through tube 90 into pressure switch 56, through tube 92 into pressure switch 60, through tube 94 and into the three-way solenoid valve 66. If the three-way solenoid valve 66 is energized, the hydrogen and oxygen gas flow through tube 96 through the optional check valve 98, through the tube 100 to manifold 36. If the three way solenoid valve 66 is de-energized, the hydrogen and oxygen gas flow is interrupted and the manifold 36 is connected through tube 100, through check valve 98, through tube 96 and through the three way solenoid valve 66 to tube 72 which vents to atmosphere.

The use of sparger 80 has several advantages. First, as the hydrogen and oxygen gas mixture passes through the sparger chamber 86, the passage of the hydrogen and oxygen gas mixture through water or other suitable fluid in the sparger chamber 80 removes traces of the electrolyte used in the electrolyzer 54. In addition, the hydrogen and oxygen gas mixture is humidified. The humidity added by the passage through the sparger 80 assists in preventing food that is being cooked from drying out. For example, without being limited by theory, it is believed that the water vapour that is picked up will condense on cold surfaces, such as the underside of a lid that is positioned on the cooking surface. This raises the humidity level in the air around the food (the cooking region) assisting in maintaining a suitable moisture level in the food. A further advantage is that the sparger prevents flashback along the hydrogen and oxygen gas feed line to the electrolyzer. For example, should the flame travel backward through tube 94, the flame will enter the sparger chamber where it will be contained. The flame cannot pass upstream past the sparger chamber 86 and enter tube 78.

In one preferred embodiment, the sparger chamber, or at least a portion thereof, is translucent or transparent, and preferably transparent and positioned such the a user may view the translucent or transparent portion or portions of the sparger chamber 86 when the appliance is in use. One advantage of this embodiment is that the user may view the gas bubbling through the sparger chamber 86. This provides visual confirmation to a user that the electrolyzer is working. In a more preferred embodiment, a light, such as a LED, is placed inside the sparger chamber, or is positioned external thereto but directed to illuminate the interior of the sparger chamber. The illumination provided by a light or lights internal or external of the sparger chamber 86 enhances the ability of a user to view the bubbles passing through the sparger chamber 86 and enhance the ability of the user to obtain visual confirmation that the electrolyzer is operating.

Figure 6:
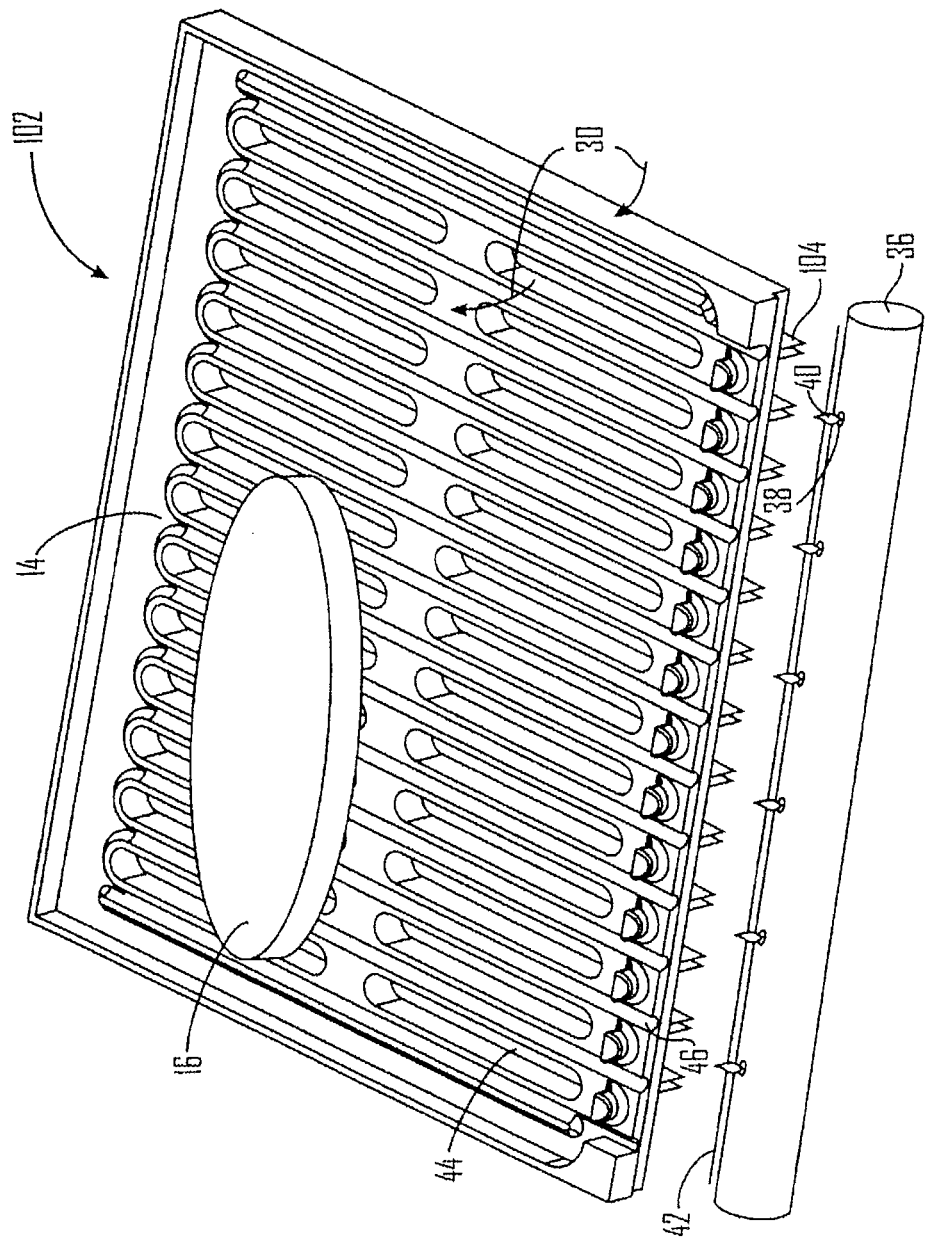
FIG. 6 is a further alternative preferred embodiment of the instant invention.

In an alternate embodiment, it will be appreciated that a cooking appliance may use a combustible fuel produced in the cooking appliance and may not utilize any electrical heating elements. Accordingly, one or burners may be supplied by an electrolyzer and/or a hydrogen storage media. For example, FIG. 6 shows an alternative preferred embodiment of the instant invention wherein electric heating elements are not embedded in the grill plate 102. The flames 40 serve to heat the air below the grill plate 102 creating, preferably, convection air currents 30 under the food 16 being cooked as well as heating the grill plate 102 whose heat transfer is preferably enhanced by an optional series of fins 104 on the lower surface of the grill plate 102. The fins 104 serve to transfer some of the heat from the flames 40 into the grill plate 102 more quickly to facilitate more rapid cooking and better charring of the food 16 being cooked. Optionally, a second set of flames can be directed to primarily heat fins 104. It will be appreciated that the cooking surface may use any construction disclosed herein and the components may be connected as shown in FIGS. 4 and 5.

In any of the forgoing embodiments, an optional upper heating element may be used to cook the top surface of food 16. Such a heating element may be a hydrogen flame burner such as burner 34, a hydrogen screen burner that provides radiant heating, an electric radiant heating element, a contact cooking surface that is electrically heated and/or heated by combustion, or a microwave energy source. Thus, the upper heating element may be used to cook food 16, or the flames 40 may be used to cook food 16, or the electric heating element 12, 12*a* may be used to cook food 16, or a combination thereof can be used to cook food 16.

It will also be appreciated that the only cooking element of a cooking appliance 10 may be an upper heating element, which is powered by a combustible fuel produced in cooking appliance 10.

It will also be appreciated that the cooking appliance 10 may be a rotisserie, i.e., the cooking appliance has a cooking support that comprises a rod for a rotisserie wherein the rod is rotatably mounted in the cooking appliance in the cooking region. The cooking region may be heated by combustion of a combustible gas produced by one or more electrolyzers. The gas may be burned in a burner and/or a radiant heating member. Alternately, electrical heating may also be used.

Figure 4A:
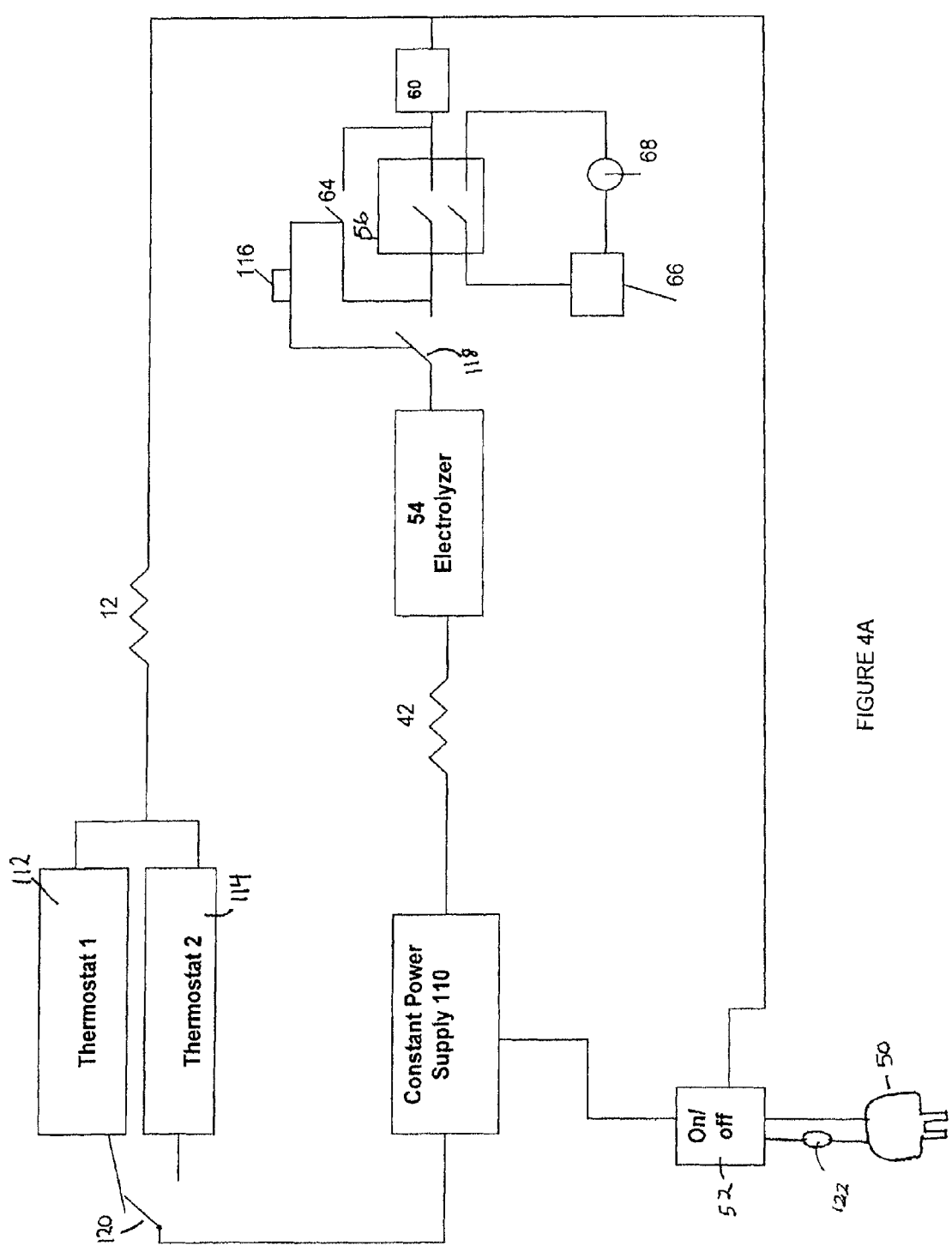

An alternate wiring schematic is shown in FIG. 4*a*. In FIG. 4*a*, a constant power supply 110 is provided. In this embodiment, two thermostats are provided—high temperate thermostat 112 and low temperate thermostat 114. Accordingly, a user may operate switch 120 to switch between a high temperature mode and low temperature mode. A variable thermostat may alternately, or in addition, be provided. When the unit is to be used, a user may plug in the appliance (e.g. insert plug 50 into an outlet) and then turn on main on/off switch 52 and press button 116 which closes switches 118 and 64. When electrolyzer 54 has produced sufficient gas to open low pressure switch 56, then solenoid 66 opens and gas will from the burners. Optional light 68 will illuminate to indicate to a user that pressure switch 56 is closed and that they may release button 56. As igniter 42 is heated while electrolyzer 54 is operating, when solenoid 66 opens and gas flows to the burners, the igniter is sufficiently hot to ignite the gas. As shown in FIG. 4*a*, a fuse may also be provided.

The appliance may be used or stored in a location wherein the ambient temperature may be below the freezing point of the fluid in the electrolyzer. If the fluid freezes in the electrolyzer, then the shape of the electrodes may be deformed, resulting in a change in the operating characteristics of the electrolyzer (e.g., the efficiency of the unit or the ability of the unit to operate). Accordingly, in an alternate embodiment, the electrolyzer is configured to be able to be drained of fluid. In such a case, one or more drain ports may be provided to withdraw fluid from the electrolyzer and are preferably positioned in the lowest portion of the electrolyzer. Any openable drain port known in the art may be used. For example, the drain port may be sealed with a drain plug that comprises a screw on cap, a bayonet mounted cap, a snap on cap, or the like or alternately a ball valve or the like may be used. Any such mechanism known in the plumbing arts may be used. The drain port may be positioned to be accessible when the domestic apparatus is assembled and preferably the drain port is positioned on the outer casing of the apparatus. Accordingly, one or more drain ports may be accessible from the exterior surface of the apparatus, such as beneath a movable cover panel. Therefore, a user may open the drain port (e.g. by unscrewing a drain plug) and empty the fluid from the electrolyzer prior to storing the appliance for the winter. Alternately, the appliance may include a small pump to drain the fluid from the electrolyzer.

Alternately or in addition, the appliance may have a fluid reservoir. The reservoir is preferably sized to receive all of the fluid from the electrolyzer. The reservoir may be removable. Therefore, a consumer may drain the electrolyzer and then remove and seal the reservoir. Accordingly, if the appliance is a built-in outdoor apparatus (e.g. a built-in barbeque or fireplace), then the user need only drain the electrolyzer fluid into the reservoir, remove the reservoir and store the reservoir for the winter. Alternately, the reservoir may be designed to receive the fluid therein and permit the fluid to freeze therein (i.e. to remain watertight despite the electrolyte solution freezing therein). Accordingly, a user need not remove the reservoir. Instead, the user need only drain the fluid from the electrolyzer into the reservoir (e.g. by opening a valve or actuating a motor in the fluid flow path between the electrolyzer and the reservoir). The reservoir is preferably sized to hold all of the fluid and permit the fluid to expand as it freezes. The reservoir may therefore have a volume that is one and a half times the volume of the electrolyzer.

The electrolyzer may be drained by using a pump to transfer the electrolyte solution from the electrolyzer to the reservoir. Similarly, the pump may be operated in reverse to transfer the electrolyte solution from the reservoir to the electrolyzer. Alternately, or in addition, gravity may be used to drain electrolyte solution from the electrolyzer to the reservoir and/or from the reservoir to the electrolyzer. For example, if the reservoir is positioned below the electrolyzer, the electrolyte solution may flow from the electrolyzer to the reservoir by, e.g., opening a valve in a flow path therebetween.

In a preferred embodiment, the position of at least one of the electrolyzer and the reservoir is moveable with respect to the other such that fluid may be caused to flow therebetween. Accordingly one, and preferably both, of the electrolyzer and the reservoir may be vertically repositionable, such as by sliding along a vertical track. Therefore, e.g., electrolyte solution may be drained from the electrolyzer to the reservoir by moving the position of at least one of the electrolyzer and the fluid reservoir so that the reservoir is below the electrolyzer.

Figure 17A:
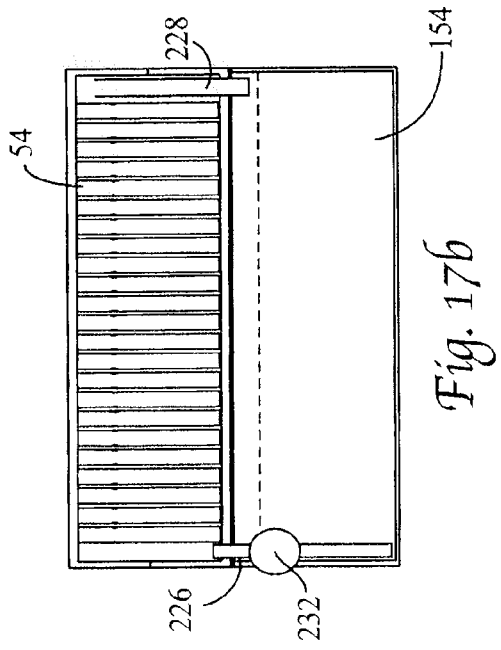
FIGS. 17a-17c are schematic drawings of a further alternate method and apparatus to drain an electrolyzer; and, FIGS. 18a-18c are schematic drawings of a further alternate method and apparatus to drain an electrolyzer.
Figure 17B:
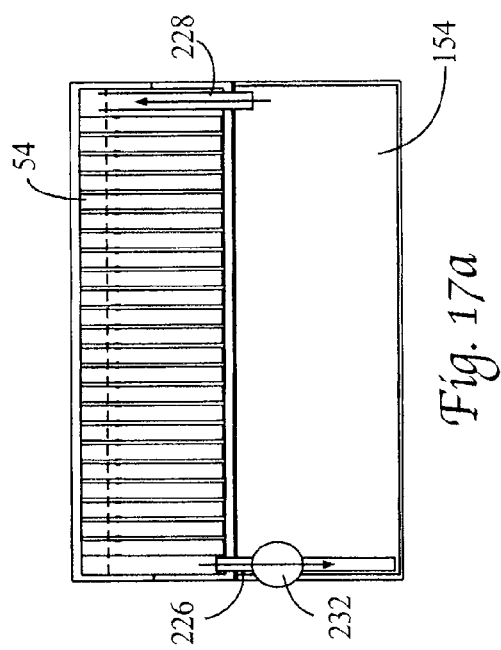
Figure 17C:
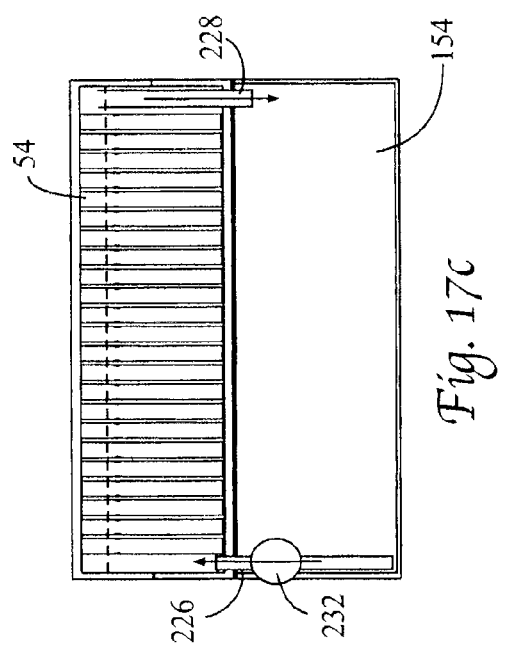
Figure 18A:
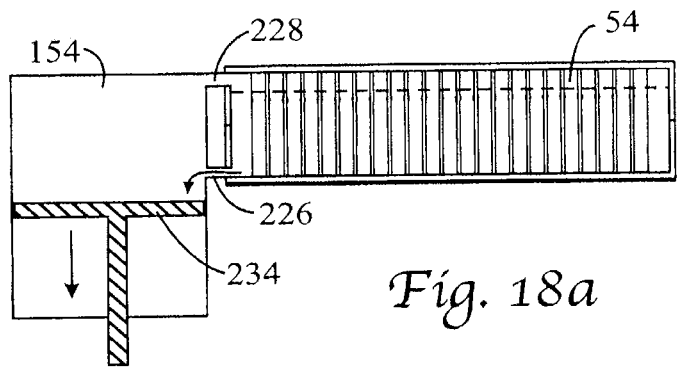
Figure 18B:
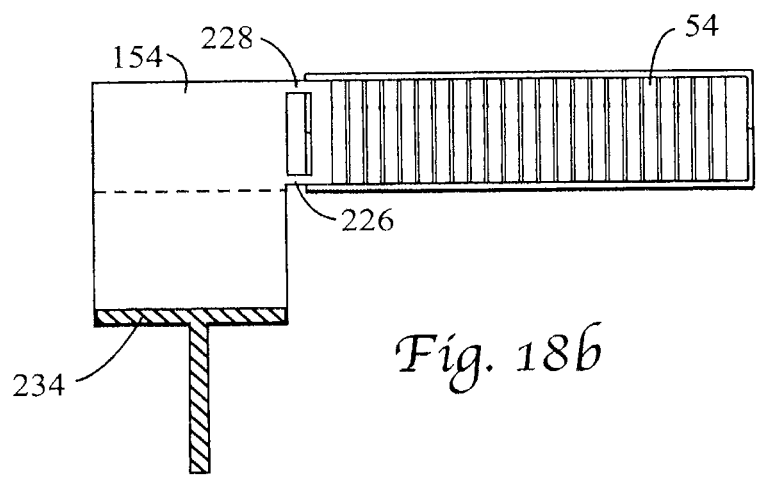
Figure 18C:
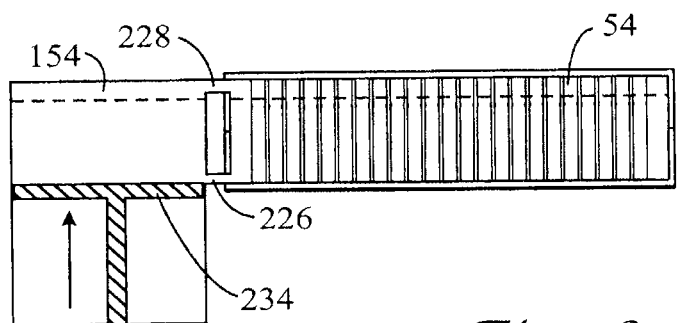

In a more preferred embodiment as exemplified in FIGS. 15*a*-15*c*, the reservoir 154 is mounted to the electrolyzer 54 and the electrolyzer and the reservoir form a one-piece assembly such that they rotate about a horizontal axis A as a unit. The assembly may be rotated to one position wherein the port in the electrolyzer is above port in the reservoir such that liquid may flow by gravity from the electrolyzer to the reservoir (see FIG. 15a) As shown in FIG. 15a liquid may drain from the electrolyzer to the reservoir via port 226 and the inflow of liquid due to gravity into the reservoir causes gas in the electrolyzer (e.g. air) to flow from the electrolyzer to the reservoir via air port 228. When the assembly is rotated (e.g., as indicated by the arrow in FIG. 15b) to another position (e.g. a 180 degree rotation as shown in FIG. 15c) the port in the reservoir is above the port in the electrolyzer such that liquid may flow by gravity from the reservoir to the electrolyzer valves including check valve may be provided to control the flow of the fluids. Alternately, or in addition, an air pump 230 to transfer gas between the electrolyzer and the reservoir (see FIGS. 16a-16c) and/or a liquid pump 232 between the electrolyzer and the reservoir (see FIGS. 17a-17c) may be used. Alternately, or in addition, the size of the reservoir 154 may be varied (such as by a moveable piston 234 that defines the bottom of the reservoir 154 (see for example FIGS. 18a-18c).

It will be appreciated that the reservoir may be used to supply make up water to the electrolyzer. Accordingly, the reservoir may have one or more fluid outlet ports in flow communication with one or more inlet ports on the electrolyzer. As water is electrolyzed in the electrolyzer, make up water may be conveyed from the reservoir to the electrolyzer. A user may manually transfer the water by, e.g., opening a valve. Alternately, the flow may be automatic, such as by a valve that is drivenly controlled by a liquid sensor (e.g. a float switch). Accordingly, as water is converted to hydrogen gas and oxygen gas, make up water may be automatically supplied to the electrolyzer.

It will be appreciated that, from time to time water will have to be added to the electrolyzer, and the optional sparger chamber 86. Accordingly, each of the electrolyzer and the sparger may be configured to be provided with make up water. In accordance with one embodiment, at least one of the electrolyzer and the reservoir, or a flow passage (e.g. a conduit) extending therebetween, has an inlet port. Similarly, the sparger has at least one inlet port. In an alternate preferred embodiment, if a sparger chamber 86 is provided, then a single inlet port is provided. The single inlet port is in fluid communication with both the sparger and the electrolyzer and therefore, both elements may be topped up with water at the same time. For example, the inlet may be branched (e.g., Y-shaped) so that a portion of the water passes to the sparger chamber and the electrolyzer. The water provided to one or both of the sparger and the reservoir may be filtered to remove particulate matter from the feed water and/or to remove anionic or cationic material therefrom. For example, the inlets may have a filter medium to filter particulate material and/or an ion exchange resin.

Any openable inlet port known in the art may be used. For example, the inlet port may be sealed with a screw on cap, a bayonet mounted cap, a snap on cap, a ball valve or the like. Any such mechanism known in the plumbing arts may be used. These inlets may be positioned to be accessible when the domestic apparatus is assembled and preferably the inlet ports are positioned on the outer casing of the apparatus. Accordingly, one or more inlet ports may be accessible from the exterior surface of the apparatus, such as beneath a movable lid 106 (e.g. a pivotally mounted portion of the outer casing of the appliance, see FIG. 7). It will be appreciated that, alternately, the apparatus may be plumbed into a domestic water supply such that make up water is provided automatically.

Figure 13:
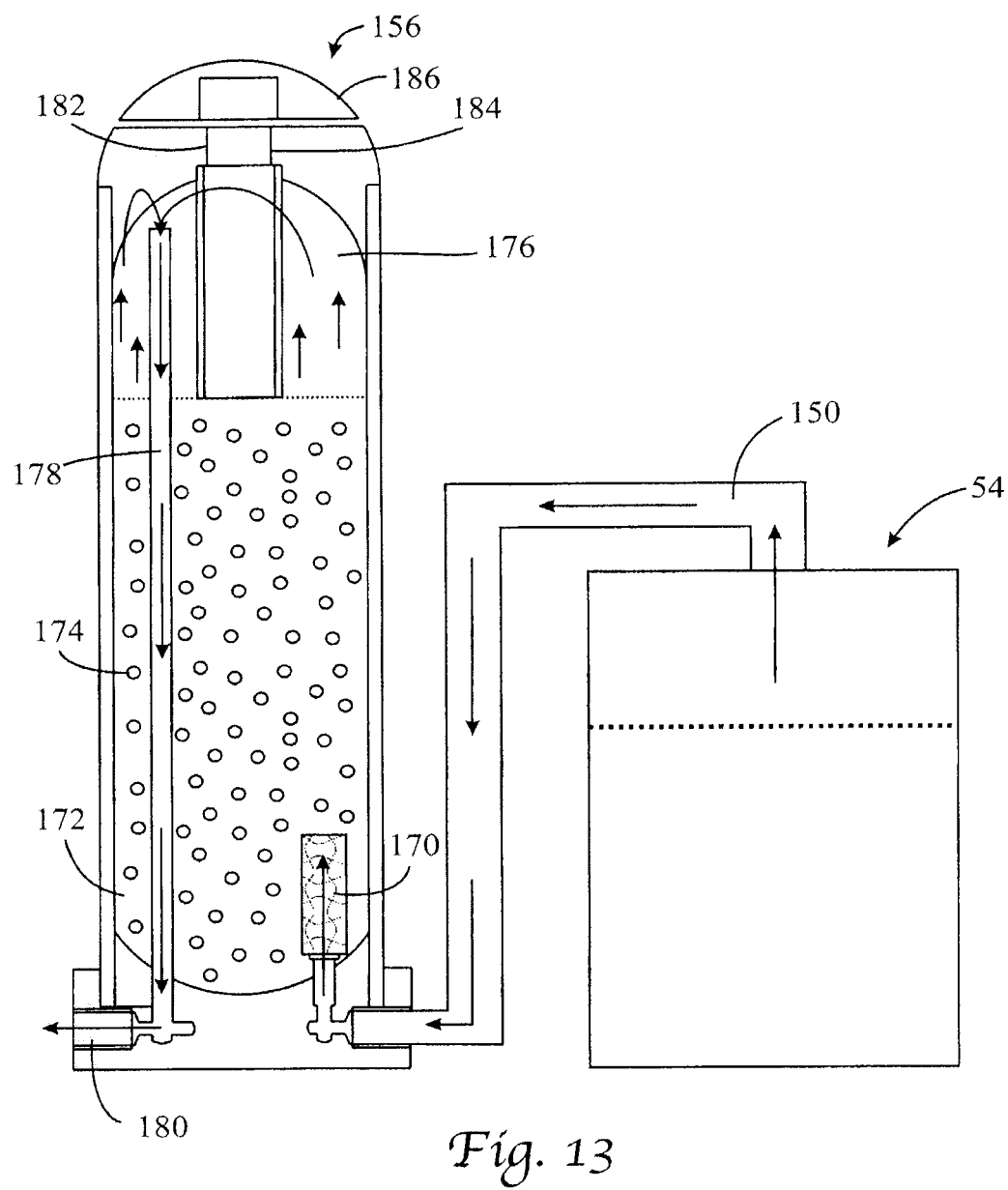
FIG. 13 is an alternate schematic drawing of the components that could be positioned inside a main casing of the grill of FIG. 7.

As exemplified in FIG. 12, a main casing 132 for an apparatus includes two electrolyzers 54 each of which has at least one combustible gas outlet port 150 and at least one make up water inlet port 152. The water inlet port 152 extends from reservoir 154. Each gas outlet port 150 extends to reservoir 154 but could optionally be connected directly to sparger 156. Each electrolyzer is filled to provide a headspace 158 above a fill line 160. As water is required, it is provided to electrolyzers 54 by any means known in the art. The hydrogen and oxygen gas are optionally not separately captured but accumulate in a single headspace 158 and flow to reservoir 154. The hydrogen and oxygen gas form bubbles 162 in the water 164 in reservoir 154. The bubbles travel upwardly to headspace 166 and flow down tube 168 to a member to introduce gas as bubbles into the water 172 in sparger 156, such as diffuser stone 170. The gas travels as bubbles 174 through water 172 to headspace 176, to down flow tube 178 to passage 180 to the burner. It will be appreciated that only one of reservoir 154 and sparger 156 may be provided. For example, in the embodiment of FIG. 12, reservoir 154 functions as a reservoir to provide make up water to electrolyzers 54 and as a sparger. Accordingly, down flow tube 168 may be connected directly to passage 180. Alternately, gas outlet ports 150 may be connected directly to sparger 156 such that reservoir 154 does not function as a sparger (see for example FIG. 13).

Each of reservoir 154 and sparger 156 has a plug 182 that resealably closes inlet ports 184. A moveably (e.g., pivotal) or removable lid or cover panel 186 is provided to hide each plug 182. It will be appreciated that a single cover panel 186 may be provided to overlie both plugs 182. When it is desired to refill the sparger and/or the reservoir, optional cover panel 186 is moved to reveal plugs 182 and plugs 182 are removed to permit water to be added to inlets 184. Reservoir 154 and sparger 156 may each have a stand pipe 188 to which may have a length such that the bottom end is at the preferred maximum liquid height in each of reservoir 154 and sparger 156

Preferably, the apparatus has a sparger liquid level indicator, such as a float switch, a graduated liquid level view port or portion of a transparent sparger chamber, or a vertical or vertically inclined tube in fluid communication with the electrolyzer such that its fluid level is indicative of the electrolyzer fluid level. Similarly, preferably the electrolyzer and/or the reservoir has a liquid level indicator. More preferably, the apparatus has a liquid level warning member, such as a float switch, or a capacitive fluid level sensor as known in the art that actuates a light and/or a speaker that emits a warning tone when the liquid level in one or more of the sparger, the electrolyzer and the reservoir drops below a predetermined level. Accordingly, a person may refill the appliance when the liquid level warning member signals that the liquid in the sparger, the electrolyzer and/or the reservoir has dropped below a predetermined level. A separate warning may be provided to indicate which element requires refilling.

It will be appreciated that the apparatus may have two reservoirs, one for storing the electrolyte solution and one for providing make up water to the electrolyzer.

In a further alternate embodiment, the appliance is designed to be used intermittently outdoors. In such a case, a heating member may be provided to thaw the reservoir and the optional sparger chamber. For example, an electric heating coil may be placed inside or around each unit. When actuated, (e.g., current flows through a wire wound around each element) the fluid in the reservoir, and the optional sparger, will thaw. The fluid may then be returned from the reservoir to the electrolyzer, such as by using a pump. This may be accomplished by running a pump used to drain the electrolyzer in reverse. Any other means known in the fluid transfer arts may be used. The user may then use the appliance.

In accordance with another alternate aspect of this invention, at least one fan or the like is provided to dilute the gas produced by the electrolyzer. For example, tube 96 may be in communication with a source of pressurized air (e.g., a fan). Therefore, the gas from the electrolyzer may be diluted with air. Accordingly, a first flow path may extend between the electrolyzer and the burner and a fan may be in fluid flow communication with a source of dilution air (e.g. the ambient) and the burner. A second flow path may extend between the fan and the burner. The second flow path may be a separate flow path or may merge with the first flow path upstream of the burner (i.e., the second flow path may be in fluid flow communication with the first flow path). Therefore, a method to inhibit flashback in the apparatus may comprise providing sufficient dilution gas under pressure to the burner to prevent flashback.

This alternate aspect has two advantages. First, the addition of the dilution air assists in stabilizing the rate of gas flow to the burners. If there is variation in current provided to the electrolyzer, then the amount of gas produced will vary. The addition of the dilution air will reduce the variation by increasing the total volume of gas delivered to the burners thereby reducing the absolute variation in the volume of gas flow to the burners. Secondly, the addition of dilution air will increase the size of the flame. This may be beneficial in order to increase the aesthetics of the unit. In particular, if the electrolyzer is used in a fireplace, then the increased size of the flame produces a more pleasing or realistic look. The amount of dilution air may be from 1 to 5 times, preferably 1 to 3 times, the volume of gas the electrolyzer is designed to produce if standard line current is available.

In accordance with another alternate aspect of this invention, at least one fan or the like is utilized to provide dilution air in the combustion region. If the igniter and other security systems should fail, then the provision of dilution air can be used to prevent the hydrogen from reaching an explosive threshold concentration. The amount of dilution air is preferably sufficient to prevent the hydrogen from reaching an explosive concentration. Preferably, the fan directs sufficient air to the combustion region to reduce the concentration of hydrogen in the combustion region to less than half the explosive threshold concentration and, more preferably, to less then a tenth of the explosive threshold concentration. The amount of dilution air may be 5-200 times, preferably 5-100 times and more preferably 25-100 times volume of gas the electrolyzer is designed to produce if standard line current is available. Preferably, the fan is automatically actuated when the electrolyzer is actuated. If the apparatus also includes a hydrogen storage member, then preferably the fan also directs air to the storage region in which the hydrogen storage member is positioned.

In accordance with a further alternate aspect of this invention, the appliance may have a catch basin positioned under the electrolyzer. The catch basin is a water impermeable open topped container which is configured to retain liquid that is received therein. If the electrolyzer develops a leak, then the catch basin will receive the fluid leaking from the electrolyzer. Thus any surface on which the appliance is positioned will not be damaged should a leak occur. The capacity of the catch basin may be at least the same as the liquid volume of the electrolyzer and, preferably, 1.5 or more times the volume of the electrolyzer. The catch basin may alternately be positioned underneath all of the plumbing of the unit which transports the fluid (e.g., the tube to the optional reservoir). The catch basin may be removable mounted. Therefore, if electrolyte solution leaks, it will be retained in the catch basin and the catch basin may be removed and carried to, e.g., a sink, where the catch basin may be emptied. Alternately, the catch basin may be sealable to permit the apparatus to be returned for repair. In a further alternate embodiment, the catch basin may extend under part, or all, of the cooking surface and also function as a drip tray.

An exemplary example of a cooking appliance that exemplifies how some of the aspects may be combined in a single cooking appliance is shown in FIGS. 7-11. As shown therein, a grill 130 has a main casing 132, an optional drip tray 134, a grill surface 136 and an optional lid 138. It will be appreciated that the size of the appliance may be selected based on the required cooking surface of grill surface 136 or aesthetic requirements. It will be appreciated that main casing 132 may comprise a base 196 and a cover plate 198 which encloses the components positioned on the base 196 (see for example FIG. 14). As shown in FIG. 14, cover plate 198 is generally U-shaped so that only a single piece of plastic or metal may enclose the components mounted within cover plate 198.

Figure 7:
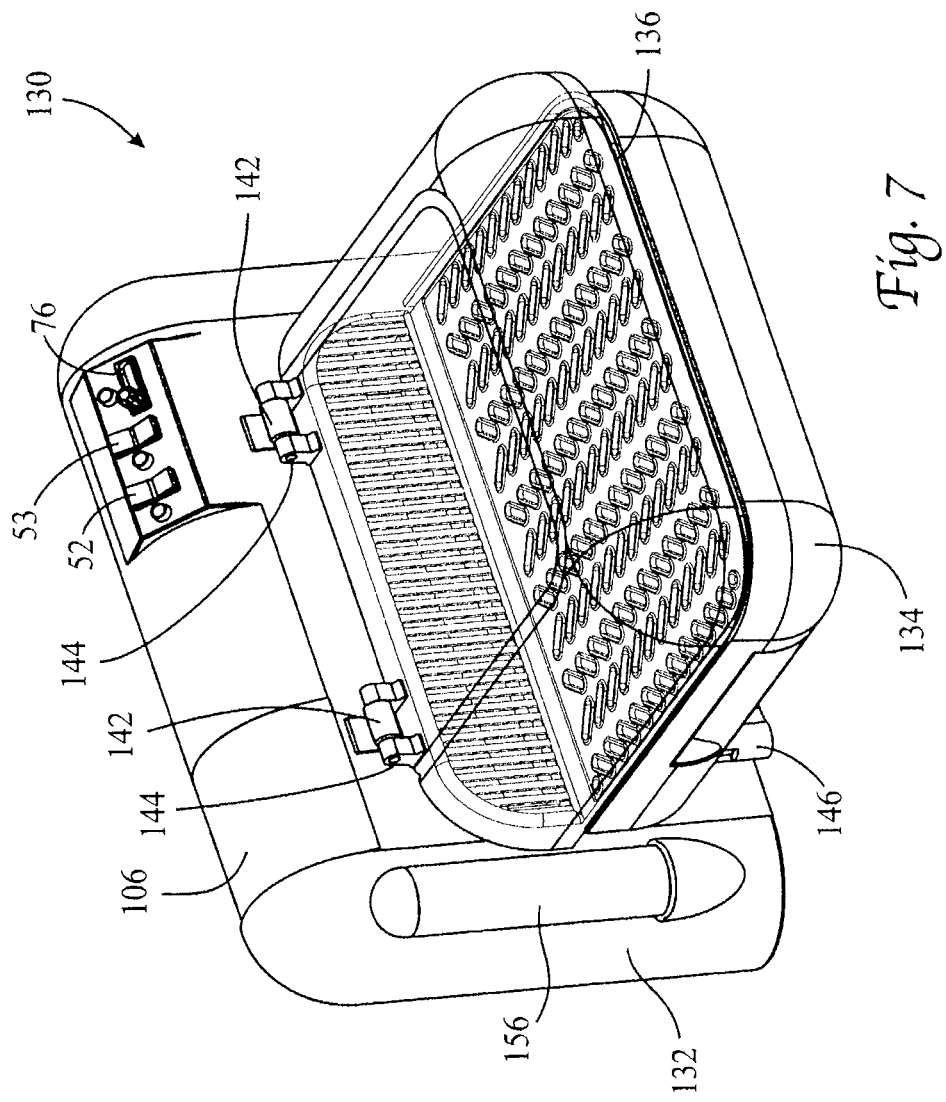
FIG. 7 is a perspective view of a grill in accordance with one embodiment of this invention.
Figure 8:
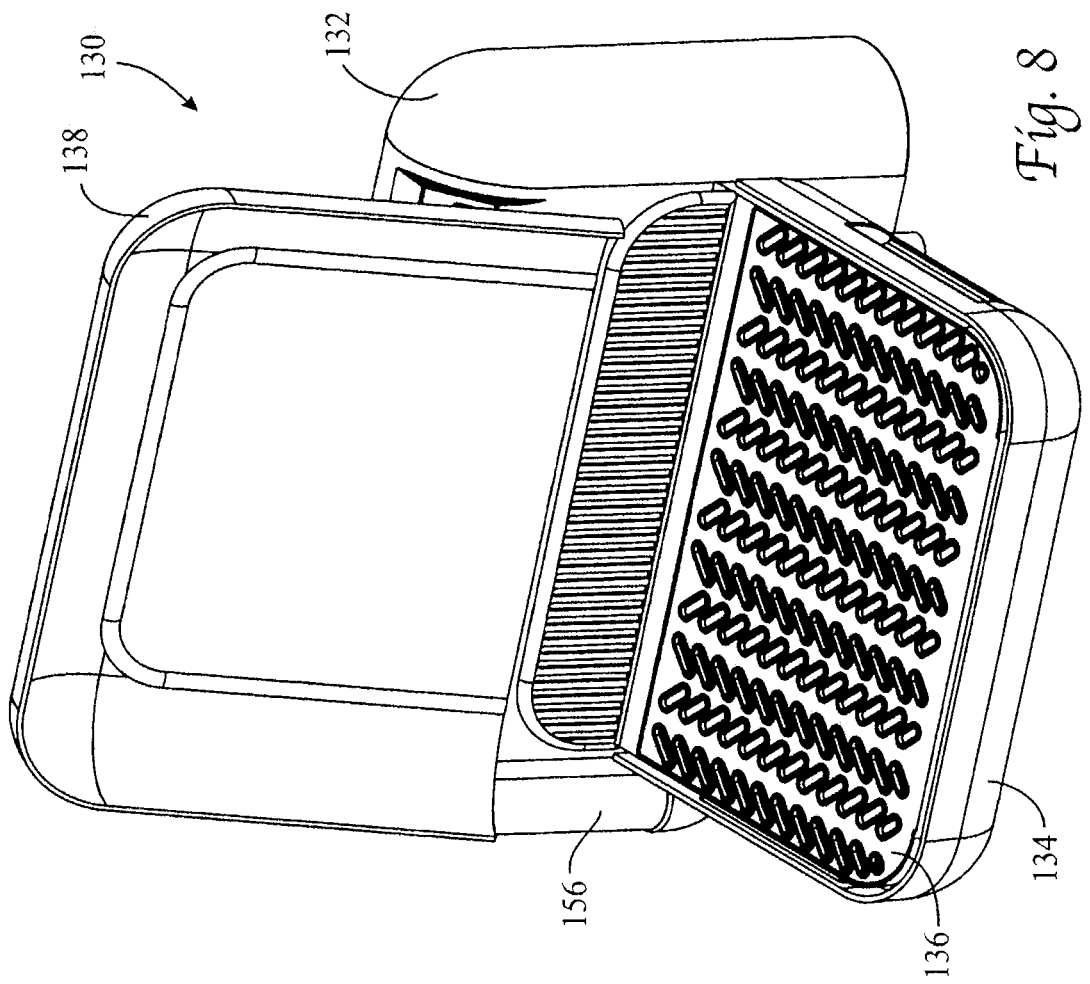
FIG. 8 is a perspective view of the grill of FIG. 7 with the lid in the raised position.
Figure 9:
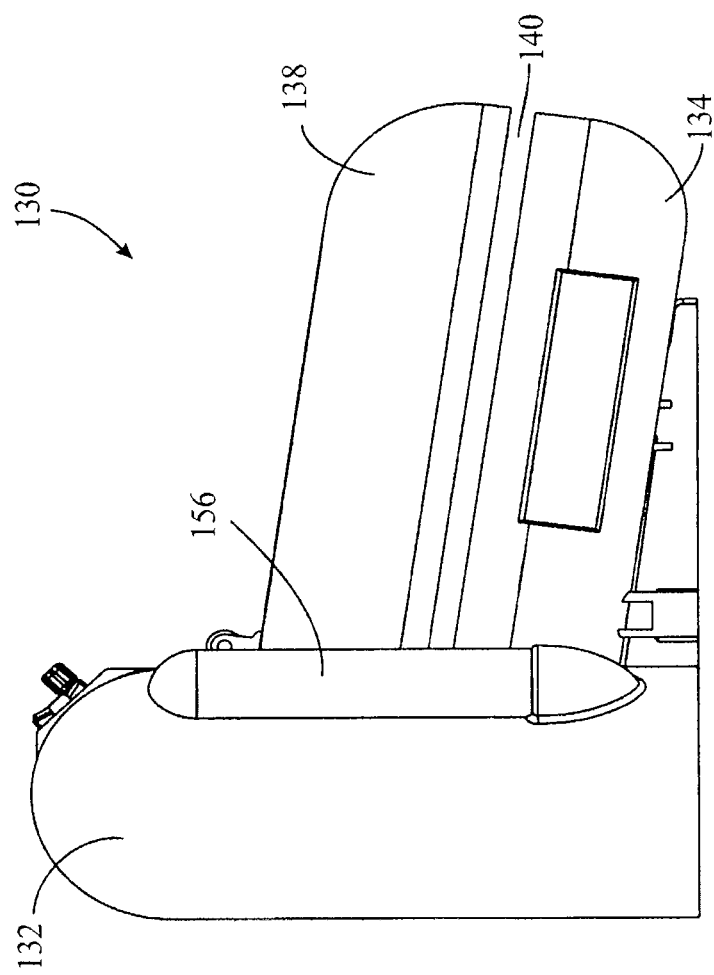
FIG. 9 is a side view of the grill of FIG. 7 with the lid in the lowered position.

The appliance preferably has a lid with is moveable between a closed position, as exemplified in FIGS. 7 and 9, and an open position, as exemplified in FIG. 8. In the closed position, the lid provides a dome over the cooking surface and assists in retaining heat and moisture in the cooking area 140 above grill surface 136 and beneath lid 138. Preferably, at least a portion of the lid, and more preferably all of the lid, is translucent or transparent and more preferably transparent to permit a user to view the food cooking on grill surface 136. For example, as shown in FIG. 14, lid 138 may have a double walled frame 192 and a transparent central portion 194, e,g., a glass or plastic plate that may be removable for cleaning. By using a double walled construction with a thermal insulating member or an air gap between the double walls, the outer temperature of the cover may be reduced and the heat loss through lid 138 may also be reduced.

Alternately, or in addition, lid 138 is positioned and configured to reflect infrared radiation received thereon towards the cooking surface (grill surface 136). For example, lid 138 may be made of aluminum or the lower surface thereof may be treated to be reflective to infrared radiation (e.g. it may be aluminized). Accordingly, infrared radiation produced by the combustion of hydrogen will travel upwardly through openings in the grill and be reflected downwardly to food on the grill 36 thereby assisting to cook the upper surface of the food in the cooking region. It will be appreciated that an upper member, positioned below the lid, may be provided to reflect infrared radiation. In a further alternate embodiment, if the grill 130 has an upper cooking surface, then the upper cooking surface preferably has an opening therein so as to permit infrared radiation to travel upwardly to the lid or upper member and then be reflected downwardly to assist in cooking the upper surface of food on grill surface 136.

Alternately, or in addition, lid 138 is moveably mounted between a closed position in which it is positioned over the lower cooking surface and an open position in which a user may access food being cooked. Lid 138 may be moveably mounted by any means known in the art, such as by pivot pins.

Alternately, or in addition, at least one of, and preferably each of, drip tray 134, grill surface 136 and lid 138 is removably mounted so that they may be removed for cleaning, storage or shipping. Drip tray 134, grill surface 136 and lid 138 may be removably mounted by any means known in the art. As shown in FIG. 7, main casing is provided with spaced apart hooks 142 and lid 138 is provided with generally U shaped members 144 that are removably receivable on hooks 142. Preferably, at least one, and more preferably each of, drip tray 134, grill surface 136 and lid 138 are dishwasher safe.

It will be appreciated that if grill surface 136 is electrically heated, then the electrical heating element incorporated in grill surface 136 must be electrically connected to a source of current when the grill surface 136 is reinserted into main casing 132. Accordingly, main casing 132 may have electric contacts and the electrical heating element is connected to the electric contacts upon grill surface 136 being mounted to main casing 132. For example, grill surface 136 may have a first mounting member, main casing 132 may have second mounting member, the first and second mounting members inter-engage whereby when the first and second mounting members inter-engage, the grill surface 136 is mounted to main casing 132 and the electrical heating element is electrically connected to the cooking appliance. This may be achieved if first and second mounting members include electrically conductive members. Accordingly, the electric heating element may be automatically electrically connected merely by mounting grill surface 136 in main casing 132. Any electrical contacts known in the art may be used.

Drip tray 134 and grill surface 136 may be removably mounted as a unit or each may be separately removable mounted. It will be appreciated that if one of drip tray 134 and grill surface 136 is removably mounted, then the other need not be as if all portions of it are accessible for cleaning when the other element is removed. For example, if drip tray 134 is removably mounted, then when drip tray 134 is removed, all portions of grill surface 136 are accessible for cleaning.

Optionally, the cooking appliance may be designed such that the electrolyzer will not function, or will cease function, if one or both of the cooking surface and the drip tray is removed from the cooking appliance. For example, the cooking appliance may have a circuit electrically connecting the electrolyzer to a power source and the circuit includes a detector. The detector detects the presence of at least one of the cooking surface and the drip tray in the cooking appliance, the circuit isolates the electrolyzer from the power source (e.g., a switch is opened) when at least one of the lower cooking surface and the drip tray is removed from the cooking appliance. In particular, the circuit may be opened when grill surface 136 having an electric heating element is removed from main casing 132 thereby removing the electric heating element from the contacts in main casing 132 and opening a circuit which includes the electrolyzer.

In one particularly preferred aspect of this embodiment, each of drip tray 134, grill surface 136 and lid 138 is configurable to reduce the volume of the appliance for shipping. It will be appreciated that when drip tray 134, grill surface 136 and lid 138 are aligned in a different manner and nested, or partially nested, the volume of the appliance may be reduced. Accordingly, it is preferred that when the appliance is packaged, that each of drip tray 134, grill surface 136 and lid 138, if provided, are separate elements and are placed in the package in a nested manner. For example, the drip tray 134 and the lid 138 may be dimensioned such that one may nest partially or fully in the other. Accordingly, those elements may be positioned in a package so as to reduce the volume of the packaging. The grill surface 136 may be generally planar and be placed adjacent the nested elements or may remain in the main casing 132.

Figure 10:
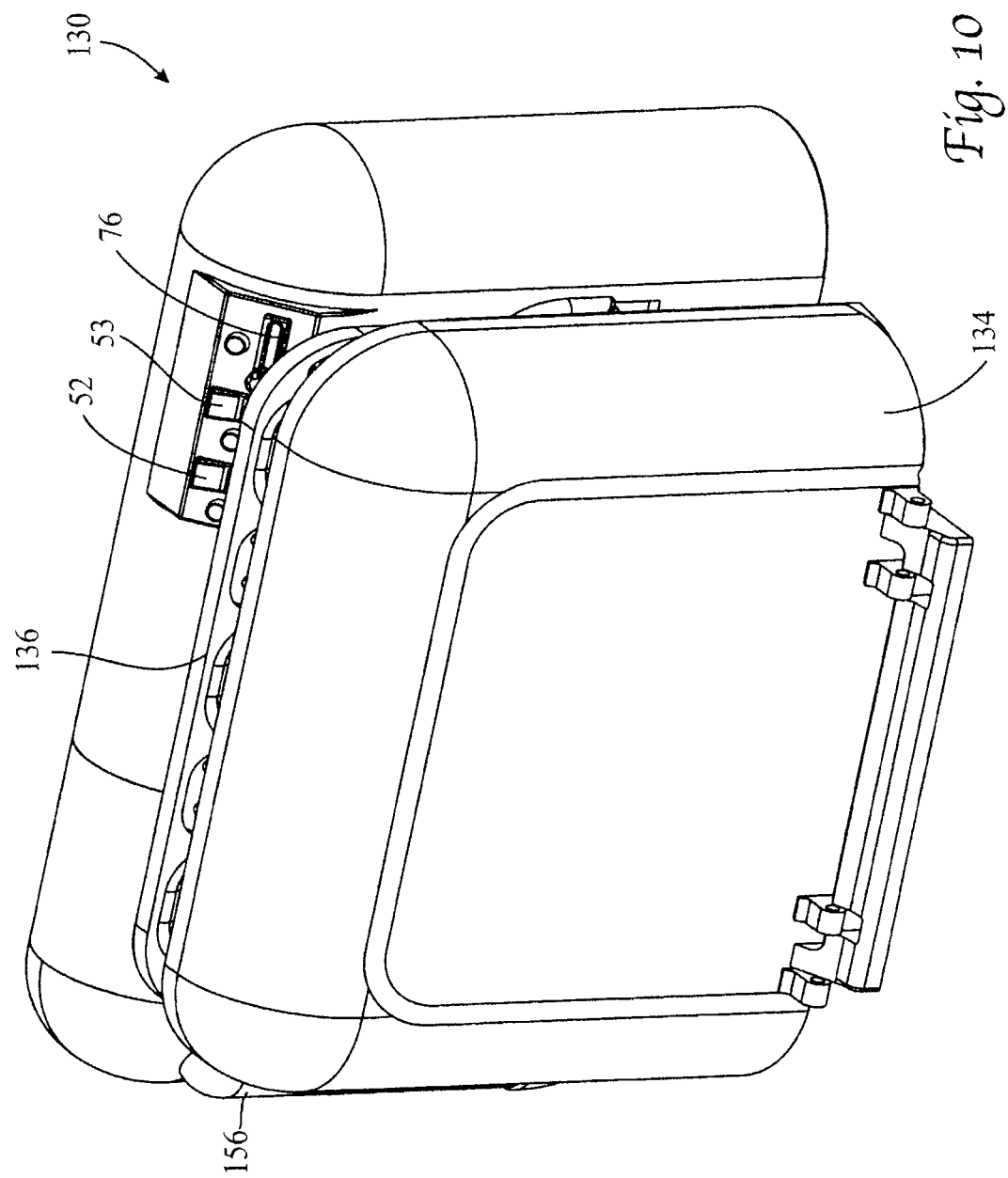
FIG. 10 is a perspective view of the grill of FIG. 7 in the disassembled or knocked down form.
Figure 11:
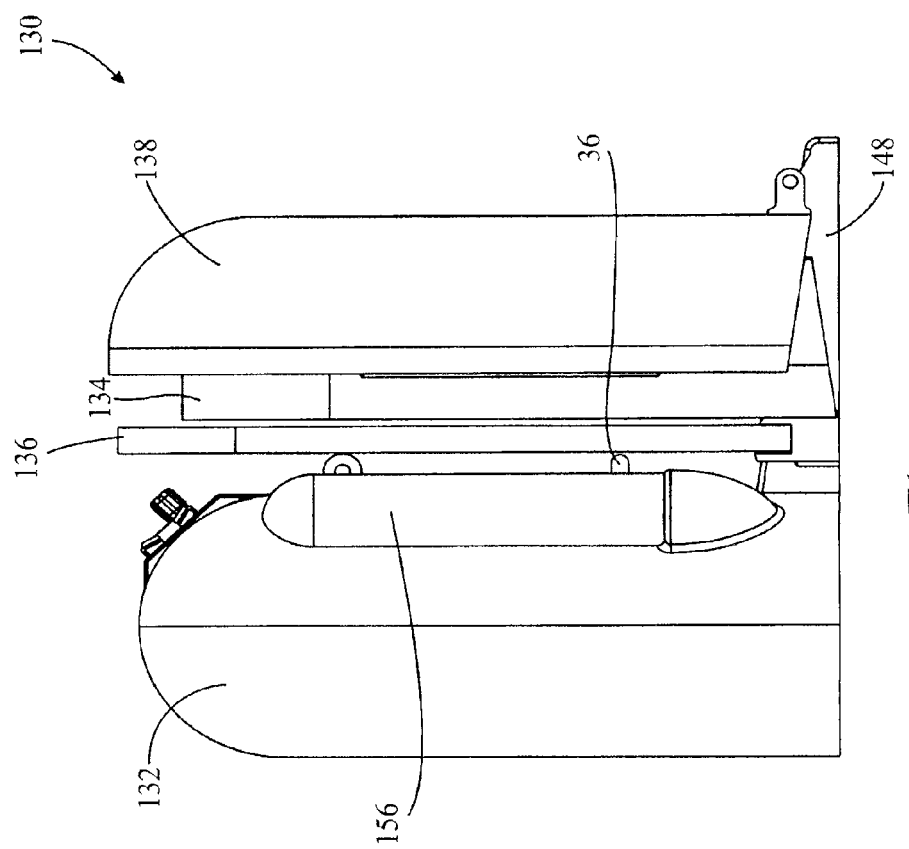
FIG. 11 is a side view of the grill of FIG. 7 in the disassembled or knocked down form.

As shown in FIGS. 10 and 11, the appliance includes a rack 146 having slots 148 or other means to receive the drip tray 134, grill surface 136 and lid 138 in a generally vertically aligned position. Accordingly, the drip tray 134 may be partially nested in lid 138 and the grill surface 136 may be positioned adjacent drip tray 134. It will be appreciated that rack 146 preferably comprises part of a foot that contacts the surface on which the appliance rests thereby assisting in stabilizing the appliance when in use. It will be appreciated that rack 146 provides a means of securing drip tray 134, grill surface 136 and lid 138 after they are washed and not yet dry. When installed in rack 146, the drip tray 134, grill surface 136 and lid 138 may drip dry.

The embodiment of FIGS. 8-11 also exemplifies a further alternate preferred embodiment of the invention wherein the electrolyzer, or the housing in which the electrolyzer is provided, comprises the spine of the apparatus. Accordingly to this alternate embodiment, some, and preferably all, of the elements which comprise the apparatus are mounted to, and may be removably mounted to, the electrolyzer, or the housing in which the electrolyzer is positioned. Therefore, the electrolyzer, or the housing in which the electrolyzer is positioned comprise the central structure of the apparatus. For example, if the apparatus is a cooking appliance, then one or more of the drip tray 134, the grill surface 136 and the lid 138 are preferably mounted to the electrolyzer, or the housing in which the electrolyzer is positioned and, more preferably, are removably mounted thereto. As shown in FIGS. 8-11, main casing 132 has a flat base that sits on a surface, such as a table or a kitchen counter. The weight of the electrolyzer in main casing 132 is a counter balance to the weight of the drip tray 134, the grill surface 136 and the lid 138 that are mounted to main casing 132. Alternately, it will be appreciated that feet may be provided and, if so, the feet are preferably mounted to main casing 132 or to the electrolyzer provided therein. One advantage of such a design is that the size of the apparatus, which is preferably a domestic apparatus and, more preferably, a cooking appliance, is reduced. Thus, the cooking appliance will more easily fit on a counter top in a kitchen.

In accordance with a further alternate aspect of the invention, any cooking appliance may incorporate a fan to provide forced convection in the cooking region. The fan may be positioned to provide forced convection in a cooking region. The cooking region is the volume of the apparatus that is heated for cooking or reheating food and may be defined by a lower cooking surface (e.g. grill surface 136) and a lid 138, a lower cooking surface and an upper cooking surface 200 (see FIG. 14) or, in the case of a rotisserie, a region between the base of the unit and the lid of the unit.

In accordance with a further alternate aspect of the invention, the cooking region may have a vertical height of $1/16$ to 4 inches, preferably $1/4$ to 2 inches and, more preferably $3/4$ to 1.5 inches. For example, as shown in FIG. 14, lower cooking surface 136 may be at a fixed height and upper cooking surface 200 may be slidably moveably on vertically extending tracks 202 by any means known in the art. For example, pins 204 may be slidable in tracks 202 and lockable at preset positions or at any desired position. The cover plate 198 of main casing 132 may have openings 136 provided therein in front of tracks 202. It will be appreciated that upper cooking surface 200 may be pivotally mounted by means of pivot pins 224.

In accordance with a further alternate aspect of the invention, the vertical height of the cooking region may be adjustable. For example, at least one of, and optionally each of, the lower cooking surface (e.g. grill surface 136) and an upper member (e.g. lid 138 or an upper cooking member) is moveable relative to the other.

In accordance with a further alternate aspect of the invention, a fan may be provided to cause air to pass through the filtration member. The fan may also result in forced convection occurring in the cooking region. The filtration member may be, for example, a porous filter media, a cyclone and/or an electrostatic filter. The exhaust air from the filtration member may be directed into the region exterior to the cooking region (e.g. the room in which the cooking appliance is situated) or back into the cooking region to preferably induce convective air currents. As exemplified in FIG. 14, motor 216 drives fan blade 218 which causes air to be drawn through filter media 220 and then returned to the cooking region.

In order to produce a desired quantity of hydrogen, the number of electrodes may be varied. Accordingly, the volume of the electrolyzer may be determined, in part, by the required number of electrodes. In the case of some appliances, the required volume of the electrolyzer may require the overall volume of the apparatus to be increased so that the housing of the apparatus may receive the electrolyzer. In accordance with a further alternate aspect of the invention a domestic apparatus comprises a plurality of electrolyzers and not just one. Accordingly, the required number of electrodes may be provided by incorporating in the domestic apparatus a first electrolyzer with a first number of electrodes and a second electrolyzer with a second number of electrodes, wherein, in totality, the two electrolyzers provide in combination the required number of electrodes. It will be appreciated that two or more electrolyzers may be provided. The plurality of the electrolyzers may be positioned in the domestic apparatus such that the volume of the domestic apparatus with the plurality of electrolyzers is smaller than if the same domestic apparatus had a single electrolyzer having the same number of electrodes as in the plurality of electrolyzers. Preferably, the footprint of the domestic apparatus with the plurality of electrolyzers is smaller than if the same domestic apparatus had a single electrolyzer having the same number of electrodes as in the plurality of electrolyzers. The plurality of electrolyzers may be connected in series and/or in parallel and may be positioned front to rear (front side of a rearward electrolyzer proximate to the rear side of an electrolyzer positioned in front of the rearward electrolyzer) or one on top of the other (see FIG. 12). In particular, as shown in FIG. 12, heat sinks 190 may be provided adjacent the upper and lower surfaces of each electrolyzer 54 so as to permit heat to be dissipated. The heat sinks may comprise a plurality of pin fins or other heat radiating or dissipating members. It will be appreciated that the heat sinks may also be provided on any other desired surfaces of electrolyzer 54 and may be integrally formed as part of the walls of the electrolyzer 54. For example, the heat sinks may be integrally formed with the walls, bottom and top panels of the electrolyzer housing such as by molding or extrusion. Alternately, they may be formed separately and then connected in thermal communication with the electrolyzer 54, such as by being adhered to a surface thereof. Heat sinks 190 and/or the electronic control package 214 may be cooled by fan blade 222 that is driven by motor 216.

In accordance with a further alternate aspect of the invention, a domestic apparatus includes an illumination member that illuminates the combustion region. The illumination member may comprise a member positioned in the combustion region and which emits light when heated. For example, the illumination member may be a light emitting diode, a fluorescent bulb, a neon bulb, a phosphor lamp, or any other lighting means known in the art or combination thereof and may be pulsed so as to create better lighting or visibility of special effects such as freezing the position of flickering flames or bubbles rising in a sparger or it may be a material such as glass or ceramic element heated by the flame to produce visible light and/or a visible flame. The illumination member may be provided in the electrolyte solution or in an optional sparger or an optional fluid level tube. The illumination member may glow when heated by the hydrogen flame, or combust or chemically react or be physically degraded when heated by the hydrogen flame, to produce a visible member indicating the presence of the flame. Alternately, the illumination member (e.g. a mirror) may reflect, and preferably reflect and enlarge, the hydrogen flame to increase the visibility of the hydrogen flame to a user. An advantage of this embodiment is that a hydrogen flame produces little or no visible light and is difficult to view. Therefore, the illumination member provides visual confirmation to a user that the electrolyzer is working and warns the user that a flame exists so that a user may not accidentally touch the flame. If the domestic apparatus is a fireplace, then the illumination member produces or enhances the aesthetic appearance of a live flame.

In accordance with a further alternate aspect of the invention, the cooking temperature is adjustable, preferably by varying at least one of, and optionally both of, the temperature of the heat source and the temperature in the cooking region. The cooking temperature may be varied by one or more of varying the distance between the heat source and the cooking support member, providing dilution air to the cooking region, varying an amount of dilution air to the cooking region, varying the amount of combustible gas produced by the electrolyzer, and varying the size of the flame. For example. a cooking appliance may have a cooking support (e.g., a cooking surface or a rotisserie rod) and a burner wherein at least one of the cooking support and the burner is moveable relative to the cooking support. Accordingly, the distance between the burning hydrogen and the food may be adjusted. Therefore, the temperature at which the food is cooked may be adjusted by manually moving, and preferably vertically moving, one or both of the cooking support and the burner. Alternately, or in addition, the power provided to the electric heating element may be adjustable. Alternately, or in addition, the power provided to the electrolyzer may be adjustable. Alternately, or in addition, the size of the orifices of the burner ports may be adjustable. Alternately, or in addition, the amount of dilution gas combined with the combustible gas may be adjustable.

In accordance with a further alternate aspect of the invention a cooking apparatus comprises a flavoring agent container. Preferably, the flavoring agent container is heat stable and is positioned in or above the combustion region. Preferably, the flavoring agent comprises a liquid and the flavoring agent container is configured to deliver the flavoring agent to at least one of the combustion region, a position above the combustion region and to food in the cooking region. The flavoring agent may be a solid or liquid such as an extract of garlic, an extract of red, green or other peppers, fruits, or vegetables including but not limited to oranges, lemons, limes, strawberries, cinnamon, vanilla, and may be delivered by, e.g., having the flavoring agent in a cup in the region of the flame or in the heat plume or the fluid may be vapourized by an electric heating means and the vapor delivered to the flame region or to the heat plume from the flame or into the region of the food where the gas plume temperature is below 650 degrees Fahrenheit It will be appreciated that each aspect of the invention is preferably used singularly, or in combination with other aspects of the instant invention, in a cooking appliance and, preferably a portable cooking appliance.

It will be appreciated that in each aspect of the invention used singularly, or in combination with other aspects of the instant invention, the combustible gas that is utilized is produced by an electrolyzer and the combustible gas comprises hydrogen produced by the electrolyzer.

The invention claimed is:

1. A domestic apparatus comprising at least one elecytolyzer, at least one burner positioned in a combustion region, a hydrogen gas flow path extending between the electrolyzer and the burner and a fan positioned to direct air into the combustion region wherein hydrogen gas has an explosive threshold concentration and the fan directs sufficient air to the combustion region to reduce the concentration of hydrogen in the combustion region to below the explosive threshold concentration.

2. The domestic apparatus of claim 1 wherein the fan directs sufficient air to the combustion region to reduce the concentration of hydrogen in the combustion region to less than half the explosive threshold concentration.

3. The domestic apparatus of claim 1 wherein the fan directs sufficient air to the combustion region to reduce the concentration of hydrogen in the combustion region to less then a tenth of the explosive threshold concentration.

4. A domestic apparatus comprising at least one elecytolyzer, at least one burner positioned in a combustion region, a hydrogen gas flow path extending between the electrolyzer and the burner and a fan positioned to direct air into the combustion region, wherein the fan is automatically actuated when the electrolyzer is actuated.

5. The domestic apparatus of claim 1 further comprising a hydrogen storage member and the hydrogen gas flow path comprises a first passage extending between the electrolyzer and the hydrogen storage member and a second passage extending between the hydrogen storage member and the burner and the fan also directs air to a storage region in which the hydrogen storage member is positioned.

6. The domestic apparatus of claim 5 wherein hydrogen gas has an combustion threshold concentration and the fan directs sufficient air to the storage region to reduce the concentration of hydrogen in the storage region to below the combustion threshold concentration.

7. A cooking appliance comprising:
(a) an elecytolyzer;
(b) a burner;
(c) a combustible fuel flow path extending between the electrolyzer and the burner;
(d) a lower cooking surface;
(e) a drip tray; and,
(f) a circuit electrically connecting the electrolyzer to a power source comprising a plug which is removably receivable in a domestic electric outlet, the circuit including a detector
wherein at least one of the lower cooking surface and the drip tray is removable mounted to the cooking appliance, the detector detects the presence of at least one of the lower cooking surface and the drip tray in the cooking appliance, the circuit isolates the electrolyzer from the power source when at least one of the lower cooking surface and the drip tray is removed from the cooking appliance.

8. A cooking appliance comprising:
(a) an elecytolyzer;
b) a burner;
(c) a combustible fuel flow path extending between the electrolyzer and the burner;
(d) a lower cooking surface comprising a food receiving surface;
(e) a drip tray; and,
(f) a circuit electrically connecting the electrolyzer to a power source, the circuit including a detector
wherein at least one of the lower cooking surface and the drip tray is removable mounted to the cooking appliance, the detector detects the presence of at least one of the lower cooking surface and the drip tray in the cooking appliance, the circuit isolates the electrolyzer from the power source when at least one of the lower cooking surface and the drip tray is removed from the cooking appliance.

9. A cooking appliance comprising:
(a) an elecytolyzer
(b) a burner;
(c) a combustible fuel flow path extending between the electrolyzer and the burner;
(d) a lower cooking surface incorporating an electrical heating member;
(e) a drip tray; and,
(f) a circuit electrically connecting the electrolyzer to a power source, the circuit including a detector
wherein at least one of the lower cooking surface and the drip tray is removable mounted to the cooking appliance, the detector detects the presence of at least one of the lower cooking surface and the drip tray in the cooking appliance, the circuit isolates the electrolyzer from the power source when at least one of the lower cooking surface and the drip tray is removed from the cooking appliance.

10. A cooking appliance comprising:
(a) an elecytolyzer;
(b) a burner;
(c) a combustible fuel flow path extending between the electrolyzer and the burner;
(d) a lower cooking surface having an electrical heating element;
(e) a drip tray; and,
(f) a circuit electrically connecting the electrolyzer to a power source, the circuit including a detector comprising electric contacts and the electrical heating element is connected to the electric contacts upon being mounted to the cooking appliance
wherein at least one of the lower cooking surface and the drip tray is removable mounted to the cooking appliance, the detector detects the presence of at least one of the lower cooking surface and the drip tray in the cooking appliance, the circuit isolates the electrolyzer from the power source when at least one of the lower cooking surface and the drip tray is removed from the cooking appliance.

11. The cooking appliance of claim 10 wherein the cooking surface has a first mounting member, the cooking appliance has a second mounting member that includes the electric contacts, the first and second mounting members inter-engage whereby when the first and second mounting members inter-engage, the cooking surface is mounted to the cooking appliance and the electrical heating element is electrically connected to the cooking appliance.

12. The cooking appliance of claim 7 wherein the cooking appliance is portable.

13. A cooking appliance comprising:
(a) an electrolyzer which produces a combustible fuel;
(b) a gas burner downstream from the electrolyzer, the gas burner having burner ports; and,
(c) a cooking surface having openings provided therein and comprising a food receiving surface that is generally corrugated in shape, the cooking surface positioned above the burner and configured to direct liquid produced when food is cooked away from the burner ports.

14. The cooking appliance of claim 13 wherein the corrugations are generally V shaped.

15. A cooking appliance comprising:
(a) an electrolyzer which produces a combustible fuel;
(b) a gas burner downstream from the electrolyzer, the gas burner having burner ports; and,
(c) a cooking surface having openings provided therein, the cooking surface positioned above the burner and configured to direct liquid produced when food is cooked away from the burner ports, wherein the cooking surface is removably mounted to the cooking appliance.

16. A cooking appliance comprising:
(a) an electrolyzer which produces a combustible fuel;
(b) a gas burner downstream from the electrolyzer, the gas burner having burner ports; and,
(c) a cooking surface having openings provided therein, the cooking surface positioned above the burner and configured to direct liquid produced when food is cooked away from the burner ports, wherein the cooking surface is electrically heated.

17. A cooking appliance comprising:
(a) an electrolyzer which produces a combustible fuel;
(b) a gas burner downstream from the electrolyzer, the gas burner having burner ports; and,
(c) a cooking surface having openings provided therein, the cooking surface positioned above the burner and configured to direct liquid produced when food is cooked away from the burner parts, wherein the cooking surface comprises a food receiving surface and an electrical heating member.

18. The cooking appliance of claim 17 wherein the food receiving surface and the electrical heating member comprise a unitary assembly.

19. The cooking appliance of claim 17 wherein the food receiving surface is removably mounted on the electrical heating member.

20. A cooking appliance comprising:
(a) an electrolyzer which produces a combustible fuel;
(b) a gas burner downstream from the electrolyzer, the gas burner having burner ports;
(c) a cooking surface having openings provided therein, the cooking surface positioned above the burner and configured to direct liquid produced when food is cooked away from the burner ports; and,
(d) further comprising a plug which is removably receivable in a domestic electric outlet.

21. The cooking appliance of claim 20 wherein the electrolyzer comprises a spine of the cooking appliance.

* * * * *

UNITED STATES PATENT AND TRADEMARK OFFICE
CERTIFICATE OF CORRECTION

| | | |
|---|---|---|
| PATENT NO. | : 8,669,499 B2 | Page 1 of 1 |
| APPLICATION NO. | : 13/610366 | |
| DATED | : March 11, 2014 | |
| INVENTOR(S) | : Wayne Ernest Conrad | |

It is certified that error appears in the above-identified patent and that said Letters Patent is hereby corrected as shown below:

In the Claims

1. Column 46, line 2, "from the burner parts, wherein" should read --from the burner ports, wherein--.

Signed and Sealed this
Fifteenth Day of July, 2014

Michelle K. Lee
*Deputy Director of the United States Patent and Trademark Office*